(12) United States Patent
Hagerty et al.

(10) Patent No.: US 7,491,776 B2
(45) Date of Patent: Feb. 17, 2009

(54) POLYMERIZATION PROCESS

(75) Inventors: Robert O. Hagerty, La Porte, TX (US);
Chia S. Chee, Houston, TX (US);
Randall B. Laird, Pasadena, TX (US);
Michael A. Risch, Seabrook, TX (US);
Pradeep P. Shirodkar, Stow, OH (US);
Zerong Lin, Kingwood, TX (US); Larry L. Iaccino, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/628,907

(22) PCT Filed: Jun. 20, 2005

(86) PCT No.: PCT/US2005/021647

§ 371 (c)(1),
(2), (4) Date: Dec. 8, 2006

(87) PCT Pub. No.: WO2006/009944

PCT Pub. Date: Jan. 26, 2006

(65) Prior Publication Data

US 2007/0293638 A1 Dec. 20, 2007

Related U.S. Application Data

(60) Provisional application No. 60/581,427, filed on Jun. 21, 2004.

(51) Int. Cl.
C08F 2/14 (2006.01)
C08F 4/69 (2006.01)
C08F 6/24 (2006.01)
C08F 10/02 (2006.01)

(52) U.S. Cl. .................. 526/135; 526/64; 526/104; 526/106; 526/206; 528/501

(58) Field of Classification Search .................. 526/64, 526/74, 106, 135, 206, 104; 528/501
See application file for complete search history.

(56) References Cited

U.S. PATENT DOCUMENTS

| | | |
|---|---|---|
| 2,534,698 A | 12/1950 | Calfee et al. |
| 2,825,721 A | 3/1958 | Hogan et al. |
| 2,915,513 A | 12/1959 | Leatherman et al. |
| 3,152,872 A | 10/1964 | Scoggin et al. |
| 3,293,000 A | 12/1966 | Marwil |
| 3,324,093 A | 6/1967 | Alleman |
| 3,470,143 A | 9/1969 | Schrage et al. |
| 3,625,658 A | 12/1971 | Closon |
| 3,816,383 A | 6/1974 | Stotko |
| 3,825,524 A | 7/1974 | Wada et al. |
| 3,858,943 A | 1/1975 | Bose et al. |
| 3,956,061 A | 5/1976 | Young et al. |
| 4,007,321 A | 2/1977 | Scholz et al. |
| 4,121,029 A | 10/1978 | Irvin et al. |
| 4,187,278 A | 2/1980 | Clifford |
| 4,194,073 A | 3/1980 | McDaniel |
| 4,199,546 A | 4/1980 | Kirch |
| 4,372,758 A | 2/1983 | Bobst et al. |
| 4,395,523 A | 7/1983 | Kirch |
| 4,424,341 A | 1/1984 | Hanson et al. |
| 4,461,889 A | 7/1984 | Hanson |
| 4,492,787 A | 1/1985 | Takashima et al. |
| 4,501,885 A | 2/1985 | Sherk et al. |
| 4,589,957 A | 5/1986 | Sherk et al. |
| 4,613,484 A | 9/1986 | Ayres et al. |
| 4,632,976 A | 12/1986 | Asanuma et al. |
| 4,690,804 A | 9/1987 | Rohlfing |
| 4,737,280 A | 4/1988 | Hanson |
| 4,794,151 A | 12/1988 | Mueller-Mall et al. |
| 5,183,866 A | 2/1993 | Hottovy |
| 5,207,929 A | 5/1993 | Sung et al. |
| 5,292,863 A | 3/1994 | Wang |
| 5,391,656 A | 2/1995 | Campbell et al. |
| 5,455,314 A | 10/1995 | Burns et al. |
| 5,565,175 A | 10/1996 | Hottovy et al. |
| 5,575,979 A | 11/1996 | Hanson |
| 5,597,892 A | 1/1997 | Hanson |
| 5,624,878 A | 4/1997 | Devore et al. |
| 5,780,565 A | 7/1998 | Clough et al. |
| 6,204,344 B1 | 3/2001 | Kendrick et al. |
| 6,239,235 B1 | 5/2001 | Hottovy et al. |
| 6,313,236 B1 * | 11/2001 | Ford et al. ............... 526/74 |
| 6,921,798 B2 * | 7/2005 | Kendrick et al. ......... 526/64 |
| 2003/0027952 A1 | 2/2003 | Farrer et al. |

FOREIGN PATENT DOCUMENTS

| | | |
|---|---|---|
| CN | 1 334 276 | 2/2002 |
| EP | 0 881 237 | 12/1998 |
| EP | 1 323 746 | 7/2003 |
| GB | 860 454 | 2/1961 |
| GB | 1 309 467 | 3/1973 |

(Continued)

OTHER PUBLICATIONS

U.S. Appl. No. 11/285,264, filed Nov. 22, 2005, Iaccino et al.
"A study of halocarbon promoter influence on catalyst reactivity and polymer Mn in vanadium-based ethylene polymerizations," Reinking, M. K. et al., Applied Catalysis A: General, Elsevier Science, Amsterdam, NL, vol. 189, No. 1, Nov. 22, 1999, 23-34, XP004272041.
Database Caplus [Online] Chemical Abstracts Service, Columbus, Ohio, US; Hanzhuo Zhang: "Catalysts for production of linear polyethylene by gas-phase fluidized bed process," XP002312614, retrieved from STN Database accession No. 2003:89705.

(Continued)

Primary Examiner—Fred M Teskin

(57) ABSTRACT

This invention is directed to processes of making polymer in the presence of a hydrofluorocarbon or perfluorocarbon and recovering the polymer. The processes provided enable polymerization processes to be practiced with minimal fouling in the reaction system, and provide polymer products that can be manufactured to relatively low densities. The invention is particularly beneficial in the production of ethylene based polymers using chromium catalyst systems.

56 Claims, 1 Drawing Sheet

FOREIGN PATENT DOCUMENTS

| | | |
|---|---|---|
| WO | WO2005/113610 | 12/2005 |
| WO | WO2005/113615 | 12/2005 |
| WO | WO2006/002132 | 1/2006 |
| WO | WO2006/009942 | 1/2006 |
| WO | WO2006/009944 | 1/2006 |
| WO | WO2006/009945 | 1/2006 |
| WO | WO2006/009946 | 1/2006 |
| WO | WO2006/009949 | 1/2006 |
| WO | WO2006/009951 | 1/2006 |
| WO | WO2006/009976 | 1/2006 |
| WO | WO2006/009977 | 1/2006 |
| WO | WO2006/009979 | 1/2006 |
| WO | WO2006/009980 | 1/2006 |
| WO | WO2006/009981 | 1/2006 |
| WO | WO2006/019494 | 2/2006 |
| WO | WO2006/025917 | 3/2006 |
| WO | WO2006/028549 | 3/2006 |
| WO | WO2006/083303 | 8/2006 |

OTHER PUBLICATIONS

Database Caplus [Online] Chemical Abstracts Service, Columbus, Ohio, US; Yoshio Tajima et al.: "Supported catalyst compositions for polymerization of olefins," XP002313105, retrieved from STN database accession No. 1996:102460.

* cited by examiner

Fouling vs. Density (at 107.8°C)

POLYMERIZATION PROCESS

CROSS REFERENCE TO RELATED APPLICATIONS

This application claims the benefit of Provisional Application No. 60/581,427 filed Jun. 21, 2004, the disclosure of which is fully incorporated herein by reference.

PRIORITY CLAIM

This application is the national phase entry into the United States Patent Office of international application number PCT/US2005/021647 Jun. 20, 2005, which claims benefit of and priority to U.S. Provisional Patent Application Ser. No. 60/581,427 filed Jun. 21, 2004.

FIELD OF THE INVENTION

This invention relates to a slurry polymerization process for making a polymer product. In particular, this invention relates to a slurry polymerization process to produce ethylene-based polymers using a chromium catalyst system and a fluorinated hydrocarbon as at least a portion of the diluent.

BACKGROUND OF THE INVENTION

Polymerization generally involves polymerization of one or more monomers to make a polymeric product. The polymerization reaction can be carried out using a wide variety of reactors, catalysts, and a wide variety of monomer feeds. Often, liquids, diluents or solvents are used in these polymerization reaction processes for various reasons such as to increase the efficiency of the polymerization reaction and recovery of polymer product.

In many polymerization processes for the production of polymer, a polymerization effluent is formed which is a slurry of particulate polymer solids suspended in a liquid medium, ordinarily the reaction diluent and unreacted monomers. A typical example of such a process in a loop reactor is disclosed in Hogan and Bank's U.S. Pat. No. 2,825,721, the disclosure of which is incorporated herein by reference. Variations and improvements of such a process in a loop reactor are described in U.S. Pat. Nos. 2,915,513, 3,152,872, 3,293,000, 3,324,093, 3,625,658, 3,816,383, 3,858,943, 3,956,061, 4,007,321, 4,121,029, 4,199,546, 4,372,758, 4,395,523, 4,424,341, 4,461,889, 4,501,885, 4,589,957, 4,613,484, 4,632,976, 4,690,804, 4,737,280, 4,794,151, 5,183,866, 5,207,929, 5,292,863, 5,391,656, 5,455,314, 5,565,175, 5,575,979, 5,597,892, 6,204,344, and 6,239,235, the disclosures of which are fully incorporated herein by reference.

Typical examples of such a process in a stirred tank reactor are disclosed in U.S. Pat. Nos. 3,825,524, 4,187,278, and 4,492,787, the disclosures of which is incorporated herein by reference. Variations and improvements of such a process in stirred tank slurry reactor systems are known to those skilled in the art.

In most commercial scale operations, it is desirable to separate the polymer and the liquid medium comprising an inert diluent and unreacted monomers in such a manner that the liquid medium is not exposed to contamination so that the liquid medium can be recycled to the polymerization zone with minimal if any purification. The liquid medium used in slurry polymerization processes is typically a saturated hydrocarbon such as isobutane or hexane. Although such diluents are not reactive in the polymerization process, the operating window (i.e. temperature and pressure) under which the polymerization process may be operated is limited by fouling in the reactor caused by agglomeration of the polymer solids in the slurry or deposition of polymer on the wall of the reactor making it impossible to recover the polymer product.

Within the conventional operating window, a particularly favored technique that has been used heretofore is that disclosed in the Scoggin et al, U.S. Pat. No. 3,152,872, more particularly the embodiment illustrated in conjunction with FIG. 2 of that patent. In such processes the reaction diluent, dissolved monomers, and catalyst are circulated in a loop reactor wherein the pressure of the polymerization reaction is about 100 to 700 psia (689 to 4826 kPa). The produced solid polymer is also circulated in the reactor. A slurry of polymer and the liquid medium is collected in one or more settling legs of the slurry loop reactor from which the slurry is periodically discharged to a flash chamber wherein the mixture is flashed to a low pressure such as about 20 psia (138 kPa). Other preferred methods for recovery of polymer product and recirculation of diluent back in to the polymerization process are shown in U.S. Pat. No. 6,204,344 to Kendrick et al. and U.S. Pat. No. 6,239,235 to Hottovy et al. The continuous withdrawal of slurry from the reactor instead of the intermittent withdrawal method permits operation of the reactors at a higher solids content which in turn leads to economically desirable higher polymer production rate for the same reactor volume. These methods also reduce the cost of diluent recovery and recirculation by utilizing a two-stage flash process wherein the first flash is performed at a pressure and temperature permitting the diluent to be reliquefied by heat exchange without the need for compression. These systems are limited in that the maximum comonomer incorporation or minimum polymer product density is limited by fouling of the polymer product in the reactor.

An example of a polymerization process that incorporates the use of a diluent other than a saturated hydrocarbon is shown in U.S. Pat. No. 3,470,143 to Schrage et al. Specifically, the Schrage patent discloses a laboratory scale polymerization reaction that incorporates the use of a fluorinated organic carbon compound as the diluent. Schrage discloses preparation of a boiling-xylene soluble polymer in a slurry which comprises polymerizing at least one ethylenically unsaturated hydrocarbon monomer to an amorphous elastomer in a reaction zone which comprises employing as a polymerization medium a fluorinated organic carbon compound.

EP 1 323 746 shows loading of biscyclopentadienyl catalyst onto a silica support in perfluorooctane and thereafter the prepolymerization of ethylene at room temperature.

U.S. Pat. No. 5,624,878 discloses the polymerization using "constrained geometry metal complexes" of titanium and zirconium.

There are always needs for improved polymerization processes. In particular, it would be advantageous in slurry polymerization processes using chromium catalysts to provide expanded operating limits in terms of pressures and temperatures and expanded product slates including lower density products than previously made in such processes and the ability to increase comonomer incorporation into a polymer chain at constant comonomer input rate. It would be further advantageous to improve such processes by providing more efficient separation of polymer product from the diluent.

SUMMARY OF THE INVENTION

The invention is directed to a process for polymerizing ethylene and optionally one or more comonomer(s) in the presence of a chromium catalyst system and a diluent to form a slurry of polymer solids, wherein the diluent comprises a fluorinated hydrocarbon.

According to one embodiment of the invention, the diluent comprises a mixture of at least one saturated hydrocarbon and at least one fluorinated hydrocarbon wherein the mixture has a density in the range of from 0.2 g/cc less than to 0.2 g/cc greater than the density of the polymer.

According to another embodiment of the invention, ethylene comprises 50 weight % or more of the total weight of ethylene and comonomer.

According to another embodiment of the invention, the polymer product has a melting temperature of greater than or equal to 75° C.

According to another embodiment of the invention, the polymer product has a heat of fusion greater than or equal to 10 J/g.

According to another embodiment of the invention, the polymer product has crystallinity derived from ethylene incorporation of greater than or equal to 10%.

According to another embodiment of the invention, the one or more comonomers contain olefinic unsaturation and are capable of insertion polymerization. Alternatively, the one or more comonomers are selected from linear, branched, or ring-containing olefins having up to 30 carbon atoms, and combinations thereof.

In any of the embodiments described herein the materials stripped or flashed off may be passed through activated carbon to remove all or part of the fluorinated hydrocarbon.

Other embodiments of the invention are defined by any two or more of the above limitations in combination. Any of the above embodiments can use a single catalyst system or multiple catalysts in a mixed catalyst system.

DETAILED DESCRIPTION OF THE INVENTION

Figure 1:
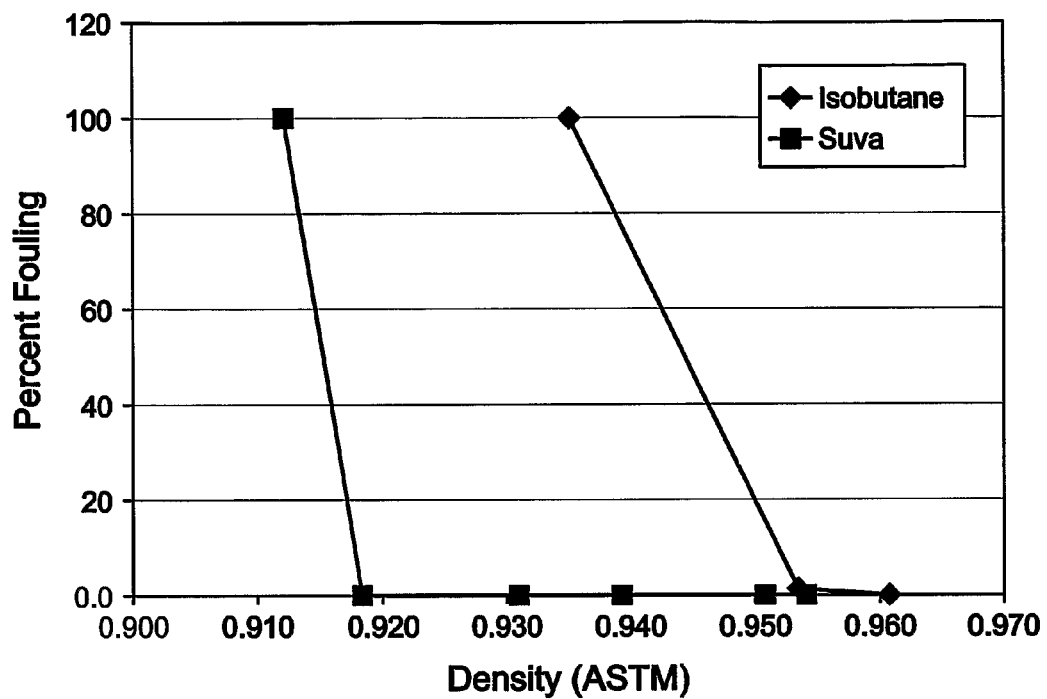
FIG. 1 shows polymer density versus fouling for fluorinated hydrocarbons vs. hydrocarbon diluents.

This invention is directed to a process for polymerizing monomer, preferably ethylene, and optionally one or more comonomer(s) in the presence of a chromium catalyst system and a diluent to form a slurry of polymer solids, wherein the diluent comprises a fluorinated hydrocarbon. The polymer made by the process of this invention can be made at particularly low densities with minimal fouling of the reactor system, thus resulting in improved operation efficiency, with low loss of heat transfer and extended run periods. Also, the invention provides for the production of polymers not typically capable of being produced in a given process thereby expanding the commercial grade slate from a particular process.

According to another embodiment of the invention, ethylene comprises 75 weight % or more of the total weight of ethylene and comonomer, alternatively 85 weight % or more, alternatively 90 weight % or more, alternatively 95 weight % or more. Under steady state operation, the amount of ethylene in the feed in the overall feed to a reactor (i.e. consumed in the reaction and excluding any recycle of monomer) can be considered equal to the weight percent ethylene in the polymer product.

According to another embodiment of the invention, the polymer product has a melting temperature of greater than or equal to 75° C., alternatively greater than or equal to 95° C., alternatively greater than or equal to 110° C., alternatively greater than or equal to 125° C.

According to another embodiment of the invention, the polymer product has a heat of fusion greater than or equal to 10 J/g, alternatively greater than or equal to 40 J/g, alternatively greater than or equal to 70 J/g, alternatively greater than or equal to 100 J/g, alternatively greater than or equal to 130 J/g.

According to another embodiment of the invention, the polymer product has crystallinity derived from ethylene incorporation of greater than or equal to 10%, alternatively greater than or equal to 20%, alternatively greater than or equal to 30%, alternatively greater than or equal to 40%, alternatively greater than or equal to 50%.

According to another embodiment of the invention, the one or more comonomers contain olefinic unsaturation and are capable of insertion polymerization. Alternatively, the one or more comonomers are selected from linear, branched, or ring-containing olefins having up to 30 carbon atoms, and combinations thereof. Alternatively, the one or more comonomers selected from linear or branched $C_3$ to $C_{20}$ alpha olefins. Alternatively, the one or more comonomers selected from linear $C_3$ to $C_8$ alpha olefins. Alternatively, the one or more comonomers include at least one polyene. Alternatively, the one or more comonomers are selected from hydrocarbons, polar moieties, and mixtures thereof. Examples of polar comonomers include, but are not limited to vinyl acids, alcohols, esters, and the like. Preferred examples include alkylmethacrylates, alkylacrylates, alkylmethacrylic acids and alkylacrylic acids. Even more preferable examples of suitable monomers include vinyl acetate, acrylic acid, methacrylic acid, methacrylate, ethylmethacrylate, methylmethacrylate, ethylacrylate and methylacrylate.

In one embodiment, the process of this invention is directed toward a slurry polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention include butadiene, norbornene, norbornadiene, isobutylene, vinylbenzocyclobutane, styrenes, alkyl substituted styrene, ethylidene norbornene, isoprene, dicyclopentadiene and cyclopentene.

In a preferred embodiment of the process of the invention, a copolymer of ethylene is produced, where with ethylene, and a comonomer having at least one alpha-olefin having from 4 to 15 carbon atoms, preferably from 4 to 12 carbon atoms, and most preferably from 4 to 8 carbon atoms, are polymerized in a slurry process.

In another embodiment of the process of the invention, ethylene and propylene is polymerized with at one additional comonomer, optionally one of which may be a diene, to form a terpolymer.

According to one embodiment of the invention, the diluent comprises a mixture of at least one saturated hydrocarbon and at least one fluorinated hydrocarbon wherein the mixture has a density in the range of from 0.2 g/cc less than to 0.2 g/cc greater than the density of the polymer, alternatively from 0.1 g/cc less than to 0.1 g/cc greater than the density of the polymer, alternatively from 0.05 g/cc less than to 0.05 g/cc greater than the density of the polymer.

According to another embodiment of the invention, the diluent comprises a mixture of at least one saturated hydrocarbon and at least one fluorinated hydrocarbon wherein the saturated hydrocarbon comprises more than 1 weight percent of the mixture, alternatively more than 5 weight percent of the mixture, alternatively more than 10 weight percent of the mixture, alternatively more than 1 volume percent of the mixture, alternatively more than 5 volume percent of the mixture, alternatively more than 10 weight percent of the mixture.

According to another embodiment of the invention, the at least one fluorinated hydrocarbon is present in the reaction mixture in a molar ratio of at least 100:1 relative to the chromium metal component, alternatively at least 500:1.

According to another embodiment of the invention, the process can be carried out in a loop reactor or a stirred tank reactor. Withdrawal of polymer product from the reactor can be accomplished by concentrating the solids for intermittent withdrawal or by continuous withdrawal of a portion of the slurry.

Other embodiments of the invention are defined by any two or more of the above limitations in combination.

The polymer made by the process of this invention can be made at particularly low densities with minimal fouling of the reactor system, thus resulting in improved operation efficiency, with low loss of heat transfer and extended run periods. Also, the invention provides for the production of polymers not typically capable of being produced in a slurry process thereby expanding the commercial grade slate from a particular process.

In addition to the production and recovery of polymer from the process, the invention provides for higher recovery of hydrocarbons that are recovered along with the polymer. Such hydrocarbons include non-polymerized materials, for example liquids, diluents, solvents, and unreacted monomers. Many of these non-polymerized materials are recovered at high efficiency and reused in the polymerization process.

Monomers and Comonomers

The processes described herein may be used in any type of monomer polymerization process. Preferably, the process is to polymerizing ethylene, and optionally ethylene with one or more additional monomers (i.e., comonomers)

Typical monomers include those having from 2 to 30 carbon atoms, preferably 2 to 12 carbon atoms, and more preferably 2 to 8 carbon atoms. Useful monomers include linear, branched or cyclic olefins; linear branched or cyclic alpha olefins; linear, branched or cyclic diolefins; linear branched or cyclic alpha-omega olefins; linear, branched or cyclic polyenes; linear branched or cyclic alpha olefins. Particularly preferred monomers include one or more of ethylene, propylene, butene-1, pentene-1, 4-methyl-pentene-1, hexene-1, octene-1, decene-1, 3-methyl-pentene-1, norbornene, norbornadiene, 3,5,5-trimethyl-1-hexene, 5-ethyl-1-nonene, vinyl norbornene, ethylidene norbornene monomers. Particularly preferred is ethylene, either alone or with one or more co-monomers, to produce a homopolymer or a copolymer.

Cyclic containing monomers that can be used in the process of this invention include aromatic-group-containing monomers containing up to 30 carbon atoms and non aromatic cyclic group containing monomers containing up to 30 carbon atoms. Suitable aromatic-group-containing monomers comprise at least one aromatic structure, preferably from one to three, more preferably a phenyl, indenyl, fluorenyl, or naphthyl moiety.

The aromatic group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment, the process of this invention relates to the polymerization of ethylene and one or more $C_3$ to $C_{20}$ linear, branched or cyclic monomers, preferably one or more $C_3$ to $C_{12}$ linear or branched alpha-olefins. In a particularly preferred embodiment, the comonomer comprises at least one comonomer having from 3 to 8 carbon atoms, preferably 4 to 7 carbon atoms. Particularly, the comonomers are selected from the group consisting of propylene, butene-1, 4-methyl-pentene-1,3-methyl-pentene-1, hexene-1 and octene-1, the most preferred group being hexene-1, butene-1 and octene-1.

In another embodiment, ethylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, ethylene/propylene/hexene-1, ethylene/propylene/norbornene and the like.

In a preferred embodiment, ethylene is present in the polymer at 50 mole % to 99.9 mole %, more preferably 70 to 98 mole %, more preferably 80 to 95 mole %. One or more comonomer(s) are present in the polymer at 0.1 mole % to 50 mole %, based upon the moles of all monomers present, more preferably 2 to 30 mole %, more preferably 5 to 20 mole %.

According to another embodiment of the invention, ethylene comprises 50 weight % or more of the total weight of ethylene and comonomer, alternatively 75 weight % or more of the total weight of ethylene and comonomer, alternatively 85 weight % or more of the total weight of ethylene and comonomer, alternatively 90 weight % or more of the total weight of ethylene and comonomer, alternatively 95 weight % or more of the total weight of ethylene and comonomer. Under steady state operation, the amount of ethylene in the feed in the overall feed to a reactor (i.e. consumed in the reaction and excluding any recycle of monomer) can be considered equal to the weight percent ethylene in the polymer product.

According to another embodiment of the invention, ethylene is polymerized with one or more comonomers, wherein the one or more comonomers contain olefinic unsaturation and are capable of insertion polymerization. Alternatively, the one or more comonomers are selected from linear, branched, or ring-containing olefins having up to 30 carbon atoms, and combinations thereof. Alternatively, the one or more comonomers selected from linear or branched $C_3$ to $C_{20}$ alpha olefins. Alternatively, the one or more comonomers selected from linear $C_3$ to $C_8$ alpha olefins. Alternatively, the one or more comonomers include at least one polyene. Alternatively, the one or more comonomers are selected from hydrocarbons, polar moieties, and mixtures thereof. Examples of polar comonomers include, but are not limited to vinyl acids, alcohols, esters, and the like. Preferred examples include alkylmethacrylates, alkylacrylates, alkylmethacrylic acids and alkylacrylic acids. Even more preferable examples of suitable monomers include vinyl acetate, acrylic acid, methacrylic acid, methacrylate, ethylmethacrylate, methylmethacrylate, ethylacrylate and methylacrylate.

In another embodiment, the polymer produced herein comprises:
 ethylene present at from 40 to 100 mole %, preferably 50 to 90 mole %, more preferably 60 to 80 mole %, and
 a second olefin monomer present at from 5 to 60 mole %, preferably 10 to 40 mole %, more preferably 20 to 40 mole %, and optionally
 a third olefin monomer present at from 0 to 10 mole%, more preferably from 0.5 to 5 mole %, more preferably 1 to 3 mole %.

Diluent

The diluents used in this invention are beneficial in producing highly useful polymer products. Use of the diluents can also provide polymer processes having reduced fouling, higher overall efficiencies and/or reduced environmental emissions. The diluents of the invention are preferably compositions added to the reaction process that reduce the concentration of one or more active materials in the process to achieve the desired and beneficial effect. Preferably, the diluent is a hydrocarbon having little to no solvent power. More preferably, the diluent is a halogen containing, most preferably fluorinated hydrocarbon, compound, and preferably having little to no solvent power with respect to the polymer product. The fluorinated hydrocarbons may be used individually or as mixtures, and can be included in a mixture with non-fluorinated hydrocarbon diluents if desired.

According to this invention, fluorinated hydrocarbons are interchangably referred to as hydrofluorocarbons or hydrofluorocarbon compounds or HFCs. The compounds have at least one carbon atom and at least one fluorine atom. The fluorinated hydrocarbon can be a perfluorinated hydrocarbon or the fluorinated hydrocarbon can optionally include one or more hydrogen atom(s). A perfluorinated hydrocarbon is a fluorocarbon in which the hydrogen directly attached to the carbon atom(s) is completely replaced by fluorine. See *Hawley's Condensed Chemical Dictionary*, Thirteenth Edition, Van Nostrand Renhold, 1997. Examples of preferred perfluorocarbons include linear branched or cyclic, $C_1$ to $C_{40}$ perfluoroalkanes.

In one embodiment, the fluorinated hydrocarbons are represented by the formula:

$$C_xH_yF_z \tag{XII}$$

wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y is greater than or equal to 0 and z is an integer and at least one, more preferably, y and z are integers and at least one. In a preferred embodiment, z is 2 or more.

In one embodiment, a mixture of fluorinated hydrocarbons are used as the diluent in the process of the invention, preferably a mixture of a perfluorinated hydrocarbon and a fluorinated hydrocarbon, and more preferably a mixture of a fluorinated hydrocarbon. In yet another embodiment, the fluorinated hydrocarbon is balanced or unbalanced in the number of fluorine atoms in the fluorinated hydrocarbon compound.

Non-limiting examples of fluorinated hydrocarbons include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,2,3,3,3,-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl) propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl) propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. In addition to those fluorinated hydrocarbons described herein, those fluorinated hydrocarbons described in Raymond Will, et. al., CEH Marketing Report, Fluorocarbons, Pages 1-133, by the Chemical Economics Handbook-SRI International, April 2001, which is fully incorporated herein by reference, are included. In another embodiment, the fluorocarbon is not a perfluorinated $C_4$ to $C_{10}$ alkane.

In another embodiment, the commercially available fluorinated hydrocarbons useful in the process of the invention include HFC-236fa having the chemical name 1,1,1,3,3,3,-hexafluoropropane, HFC-134a having the chemical name 1,1,1,2-tetrafluoroethane, HFC-245fa having the chemical name 1,1,1,3,3-pentafluoropropane, HFC-365mfc having the chemical name 1,1,1,3,3-pentafluorobutane, R-318 having the chemical name octafluorocyclobutane, and HFC-43-10mee having the chemical name 2,3-dihydrodecafluoropentane and/or BFC-365mfc, all of these are commercially available fluorinated hydrocarbons.

In another embodiment, the fluorocarbon is not a perfluorinated C4 to C10 alkane. In another embodiment, the fluorocarbon is not a perfluorinated hydrocarbon. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, fluorobenzene, or perfluorotoluene. In a particularly preferred embodiment, the fluorocarbon consists essentially of hydrofluorocarbons.

In another embodiment the fluorocarbon is present at more than 1 weight %, based upon the weight of the fluorocarbon and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In another embodiment the fluorocarbon is present at more than 1 weight %, based upon the weight of the fluorocarbons, monomers and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In the event that the weight basis is not named for the weight % fluorocarbon, it shall be presumed to be based upon the total weight of the fluorocarbons, monomers and hydrocarbon solvents present in the reactor.

In another embodiment the fluorocarbon, preferably the hydrofluorocarbon, is present at more than 1 volume %, based upon the total volume of the fluorocarbon, monomers and any hydrocarbon solvent present in the reactor, preferably greater than 3 volume %, preferably greater than 5 volume %, preferably greater than 7volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55volume %, preferably greater than 60 volume %, preferably greater than 65 volume %.

In another embodiment the fluorocarbon is a blend of hydrofluorocarbon and perfluorocarbon, and preferably the hydrofluorocarbon is present at more than 1 volume %, based upon the total volume of the hydrofluorocarbon and perfluorocarbon present in the reactor (with the balance being made up by the perfluorocarbon), preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In yet another embodiment, the fluorinated hydrocarbons of the invention have a molecular weight (MW) greater than 30 a.m.u., preferably greater than 35 a.m.u., and more preferably greater than 40 a.m.u. In another embodiment, the fluorinated hydrocarbons of the invention have a MW greater than 60 a.m.u., preferably greater than 65 a.m.u, even more preferably greater than 70 a.m.u., and most preferably greater than 80 a.m.u. In still another embodiment, the fluorinated hydrocarbons of the invention have a MW greater than 90 a.m.u., preferably greater than 100 a.m.u., even more preferably greater than 135 a.m.u., and most preferably greater than 150 a.m.u. In another embodiment, the fluorinated hydrocarbons of the invention have a MW greater than 140 a.m.u., preferably greater than 150 a.m.u., more preferably greater than 180 a.m.u., even more preferably greater than 200 a.m.u., and most preferably greater than 225 a.m.u. In an embodiment, the fluorinated hydrocarbons of the invention have a MW in the range of from 30 a.m.u. to 1000 a.m.u., preferably in the range of from 100 a.m.u. to 500 a.m.u., more preferably in the range of from 100 a.m.u. to 300 a.m.u., and most preferably in the range of from about 100 a.m.u. to about 250 a.m.u.

In yet another embodiment, the fluorinated hydrocarbons of the invention have normal boiling point in the range of from about −100° C. to 100° C. or the polymerization temperature (whichever is lower), preferably a polymerization temperature of about 70° C. to about 115° C., preferably the normal boiling point of the fluorinated hydrocarbons is in the range of from −80° C. to about 90° C., more preferably from about −60° C. to about 85° C., and most preferably from about −50° C. to about 80° C. In an embodiment, the fluorinated hydrocarbons of the invention have normal boiling point greater than −50° C., preferably greater than −50° C. to less than −10° C. In a further embodiment, the fluorinated hydrocarbons of the invention have normal boiling point less than −5° C., preferably greater than −5° C. to less than −20° C. In one embodiment, the fluorinated hydrocarbons of the invention have normal boiling point greater than −10° C., preferably greater than −10° C. to about 60° C.

In another embodiment, the fluorinated hydrocarbons of the invention have a liquid density @20° C. (g/cc) of 2.0 g/cc or less, preferably 1.6 cc/g or less, and most preferably 1.5 g/cc or less. In one embodiment, the fluorinated hydrocarbons of the invention have a liquid density @20° C. (g/cc) less than 1.6 g/cc, preferably less than 1.55 g/cc, and most preferably less than 1.50 g/cc. In one embodiment, the fluorinated hydrocarbons of the invention have a liquid density @20° C. (g/cc) less than 1.50 g/cc, preferably less than 1.45, and most preferably less than 1.40 g/cc.

In one embodiment, the fluorinated hydrocarbons of the invention have a ΔH Vaporization at the normal boiling point as measured by standard calorimetry techniques in the range between 100 kJ/kg to less than 500 kJ/kg, preferably in the range of from 110 kJ/kg to less than 450 kJ/kg, and most preferably in the range of from 120 kJ/kg to less than 400 kJ/kg.

In another preferred embodiment, the diluent used in the invention comprises any combination of two or more fluorinated hydrocarbons having the aforementioned MW, normal boiling point, ΔH Vaporization, and liquid density values and ranges. In a preferred embodiment, the fluorinated hydrocarbons useful in the process of the invention have a MW greater than 30 a.m.u, preferably greater than 40 a.m.u, and a liquid density less than 2.0 g/cc, preferably less than 1.8 g/cc. In yet another preferred embodiment, the fluorinated hydrocarbons useful in the process of the invention have a liquid density less than 1.9 g/cc, preferably less than 1.8 g/cc, and a normal boiling point greater than −100° C., preferably greater than −30° C. up to the polymerization temperature of the process, which is as high as 100° C., preferably less than 90° C., and more preferably less than 85° C., and most preferably less than 80° C. In one embodiment, the fluorinated hydrocarbons useful in the process of the invention have a MW greater than 30 a.m.u, preferably greater than 40 a.m.u, and a ΔH Vaporization in the range of from 100 kj/kg to less than 500 kj/kg, and optionally a liquid density less than 2.0 g/cc, preferably less than 1.8 g/cc. In yet another embodiment, the fluorinated hydrocarbons useful in the process of the invention have a liquid density less than 1.9 g/cc, preferably less than 1.8 g/cc, and a normal boiling point greater than −50° C., preferably greater than −30° C. up to the polymerization temperature of the process, which is as high as 100° C., preferably less than 90° C., and more preferably less than 85° C., and most preferably less than 80° C., and optionally a ΔH Vaporization in the range of from 120 kj/kg to less than 400 kj/kg.

In yet another embodiment, the diluent includes one or more fluorinated hydrocarbon(s), alone or in combination, with one or more other typical inert hydrocarbon fluid(s) (non-fluorinated) are used in the process of the invention. Preferably, the hydrocarbon solvent is an aliphatic or aromatic hydrocarbon fluids. Examples of suitable, preferably inert, hydrocarbon fluids are readily volatile liquid hydrocarbons, which include, for example, saturated hydrocarbons containing from 1 to 50, preferably 3 to 20, carbon atoms. Preferred examples include propane, n-butane, isobutane (MW of 58.12 a.m.u., a liquid density of 0.55 g/cc, and normal boiling point as above described of −11.75), n-pentane, isopentane (MW of 72.15 a.m.u., a liquid density of 0.62 g/cc, and normal boiling point of 27.85), neopentane, n-hexane, cyclohexane, isohexane, octane, and other saturated C6 to C8 hydrocarbons. Preferred hydrocarbon fluids also include alkanes (preferably C1 to C8 alkanes), such as propane, isobutane, mixed butanes, hexane, pentane, isopentane, desulphurized light virgin naphtha, cyclohexane and octane, are preferred. In one embodiment, the diluent further comprises at least one C1 to C40 alkane, alternatively C2 to C8 alkane.

According to another embodiment of the invention, the diluent comprises a mixture of at least one inert hydrocarbon fluid (non-fluorinated) and at least one fluorinated hydrocarbon, wherein the mixture has a density @20° C. (g/cc) in the range of from 0.2 g/cc less than to 0.2 g/cc greater than the density of the polymer, alternatively from 0.1 g/cc less than to 0.1 g/cc greater than the density of the polymer, alternatively from 0.05 g/cc less than to 0.05 g/cc greater than the density of the polymer.

In another embodiment the fluorocarbon is present at more than 5 weight %, based upon the weight of the fluorocarbon and any hydrocarbon solvent present in the reactor, preferably greater than 7 weight %, preferably greater than 10 weight %, preferably greater than 15 weight %.

In another embodiment, the diluent is selected based upon its solubility or lack thereof in a particular polymer being produced. Preferred diluents have little to no solubility in the polymer. Solubility in the polymer is measured by forming the polymer into a film of thickness between 50 and 100 microns, then soaking it in diluent (enough to cover the film) for 4 hours at the relevant desired temperature in a sealed container or vessel. The film is removed from the diluent, exposed for 90 seconds to evaporate excess diluent from the surface of the film, and weighed. The mass uptake is defined as the percentage increase in the film weight after soaking. The diluent or diluent mixture is selected so that the polymer has a mass uptake of less than 4 weight %, preferably less than 3 weight %, more preferably less than 2 weight %, even more preferably less than 1 weight %, and most preferably less than 0.5 weight %.

Ideally, the fluorocarbon is inert to the polymerization reaction. By "inert to the polymerization reaction" is meant that the fluorocarbon does not react chemically with the, monomers, catalyst system or the catalyst system components. (This is not to say that the physical environment provided by an fluorocarbons does not influence the polymerization reactions, in fact, it may do so to some extent, such as affecting activity rates. However, it is meant to say that the fluorocarbons are not present as part of the catalyst system.)

In a preferred embodiment, the diluent(s) or mixtures thereof, preferably, the fluorinated hydrocarbon(s) or mixtures thereof, are selected such that the polymer melting temperature Tm is reduced (or depressed) by not more than 15° C. by the presence of the diluent. The depression of the polymer melting temperature ☐Tm is determined by first measuring the melting temperature of a polymer by differential scanning calorimetry (DSC), and then comparing this to a similar measurement on a sample of the same polymer that has been soaked with the diluent. In general, the melting temperature of the soaked polymer will be lower than that of the dry polymer. The difference in these measurements is taken as the melting point depression ☐Tm. It is well known to those in the art that higher concentrations of dissolved materials in the polymer cause larger depressions in the polymer melting temperature (i.e. higher values of ☐Tm). A suitable DSC technique for determining the melting point depression is described by, P. V. Hemmingsen, "Phase Equilibria in Polyethylene Systems", Ph. D Thesis, Norwegian University of Science and Technology, March 2000, which is incorporated herein by reference. (A preferred set of conditions for conducting the tests are summarized on Page 112 of this reference.) The polymer melting temperature is first measured with dry polymer, and then repeated with the polymer immersed in liquid (the diluent to be evaluated). As described in the reference above, it is important to ensure that the second part of the test, conducted in the presence of the liquid, is done in a sealed container so that the liquid is not flashed during the test, which could introduce experimental error. In one embodiment, the ☐Tm is less than 12° C., preferably less than 10° C., preferably less than 8° C., more preferably less than 6° C., and most preferably less than 4° C. In another embodiment, the measured ☐Tm is less than 5° C., preferably less than 4° C., more preferably less than 3° C., even more preferably less than 2° C., and most preferably less than 1° C.

Chromium Catalyst System

The polymer is formed in a catalytic process using a chromium catalyst system. The chromium catalyst system used in this invention includes a chromium catalyst, preferably a supported chromium catalyst, as well as one or more optional components including an optional cocatalyst. The support can be any suitable polymerization catalyst support. The use of the chromium catalyst system provides the capability of producing a polymer product with little to no reactor fouling, and producing a polymer product that is very low in density.

Supports suitable for use in this invention generally include one or more refractory metal oxides. Exemplary refractory metal oxides include, but are not limited to, inorganic oxides, either alone or in combination, phosphated inorganic oxides, and mixtures thereof. Other examples of suitable supports include alumina, boria, magnesia, thoria, zirconia, silica, or mixtures thereof. In one embodiment, the metal oxides are selected from the group consisting of silica-alumina, fluorided alumina, silated alumina, aluminophosphate, aluminum phosphate, phosphated silica, phosphated alumina, silica-titania, preprecipitated silica/titania, fluorided/silated alumina and mixtures thereof. The catalyst support can be prepared in accordance with any conventional or other method effective for forming an active catalyst system. Exemplary support method preparations are given in U.S. Pat. Nos. 3,887,494; 3,900,457; 4,053,436; 4,151,122; 4,294,724; 4,392,990; 4,438,027; and 4,405,501; the disclosures of which are incorporated herein by reference.

In one embodiment of the invention, the support material is a silica containing material, preferably comprising at least 70 weight % silica, more preferably at least 75 weight % silica, and most preferably at least 80 weight % silica. In another embodiment, the remainder of the silica containing support material includes at least one component selected from the group consisting of alumina, boria, magnesia, thoria, zirconia, and mixtures thereof. Other components can also be present in the support material. It is preferred, however, that the other included components do not substantially adversely affect the catalyst system at the quantity included.

The chromium component of the catalyst can be one or more organic or inorganic chromium compounds, wherein the chromium oxidation state is from 0 to 6. As used in this disclosure, chromium metal is included in this definition of a chromium source. Preferably, the chromium source will have a formula of $CrX_n$, wherein X is the same or different and is any organic or inorganic group effective in providing an active catalyst, and n is an integer from 1 to 6. Exemplary organic groups have from about 1 to about 20 carbon atoms, and are selected from the group consisting of alkyl, alkoxy, ester, ketone, carboxy, and amido. The organic groups can be straight-chained or branched, cyclic or acyclic, aromatic or aliphatic, and can be made of mixed aliphatic, aromatic, and/or cycloaliphatic groups. Exemplary inorganic groups include, but are not limited to halides, nitrates, sulfates, and/or oxides.

Preferably, the chromium catalyst is made from a chromium(II)- and/or chromium(III)-containing compound, which can yield a catalyst system with oligomerization and/or polymerization activity. Most preferably, the chromium catalyst is made from a chromium(III) compound, because of ease of use, availability, and enhanced catalyst system activity.

Examples of chromium compounds include, but are not limited to, chromium carboxylates, chromium naphthenates, chromium halides, chromium pyrrolides, and/or chromium dionates. Other exemplary chromium compounds include, but are not limited to, chromium 2,2,6,6-tetramethylheptanedionate $[Cr(TMHD)_3]$, chromium 2-ethylhexanoate $[Cr(EH)_3]$, chromium naphthenate $[Cr(Np)_3]$, chromium chloride, chromium tris(2-ethylhexanoate), chromous bromide, chromic bromide, chromous chloride, chromic chloride, chromous fluoride, chromic fluoride, chromium oxy-2-ethylhexanoate, chromium dichloroethylhexanoate, chromium acetylacetonate, chromium acetate, chromium butyrate, chromium neopentanoate, chromium laurate, chromium stearate, chromium oxalate, and chromium bis(2-ethylhexanoate).

In general, chromium pyrrolides can be made from any pyrrole-containing compound that will react with a chromium compound to form a chromium pyrrolide complex. As used in this disclosure, the term "pyrrole-containing compound" refers to hydrogen pyrrolide, i.e., pyrrole, ($C_4H_5N$), derivatives of hydrogen pyrrolide, as well as metal pyrrolide complexes. A "pyrrolide" is defined as a compound comprising a 5-membered, nitrogen-containing heterocycle, such as, for example, pyrrole, derivatives of pyrrole, and mixtures thereof. Broadly, the pyrrole-containing compound can be pyrrole and/or any heteroleptic or homoleptic metal complex or salt, containing a pyrrolide radical, or ligand. The pyrrole-containing compound can be either affirmatively added to the reaction, or generated in-situ.

Generally, the pyrrole-containing compound will have from about 1 to about 20 carbon atoms per molecule. Exemplary pyrrolides are selected from the group consisting of hydrogen pyrrolide (pyrrole), lithium pyrrolide, sodium pyrrolide, potassium pyrrolide, cesium pyrrolide, and/or the salts of substituted pyrrolides, because of high reactivity and activity with the other reactants. Examples of substituted pyrrolides include, but are not limited to, pyrrole-2-carboxylic acid, 2-acetylpyrrole, pyrrole-2-carboxaldehyde, tetrahydroindole, 2,5-dimethylpyrrole, 2,4-dimethyl-3-ethylpyrrole, 3-acetyl-2,4-dimethylpyrrole, ethyl-1-2,4-dimethyl-5-(ethoxycarbonyl)-3-pyrrole-propionate, ethyl-3,5-dimethyl-2-pyrrolecarboxylate. When the pyrrole-containing compound contains chromium, the resultant chromium compound can be called a chromium pyrrolide. In one embodiment, the pyrrole-containing compounds used in this invention are selected from the group consisting of hydrogen pyrrolide (pyrrole ($C_4H_5N$)) and 2,5-dimethylpyrrolole.

A supported chromium catalyst is preferably made by combining the chromium component with the support. In one embodiment, the chromium component is combined with the support to form a co-precipitated tergel. The term "tergel" generally refers to the product resulting from gelation together of silica, titania, and chromium. Alternatively, an aqueous solution of a water soluble chromium component can be added to a hydrogel of the support component, wherein the term "hydrogel" is defined as a support component containing water. As a further alternative, a solution of a hydrocarbon soluble chromium component, such as tertiary butyl chromate, a diarene chromium compound, biscyclopentadienyl chromium or chromium acetylacetonate, can be used to impregnate a xerogel support. "Xerogel" is a support component that has been dried and is substantially water-free.

The resulting chromium and support composition is activated prior to use, preferably in an oxygen environment under appropriate calcination conditions. Preferably, the oxygen environment is air, more preferably dry air. The activation is preferably carried out at an elevated temperature for about 30 minutes to about 50 hours, more preferably for about 2 to about 10 hours. A temperature range of from 300° C. to 1000° C. is preferred, more preferably from about 400° C. to about 900° C. Under these conditions, at least a substantial portion of any chromium in the lower valence state is converted to the hexavalent form.

The activated catalyst system is preferably cooled and subjected to at least partial reduction of the hexavalent chromium to a lower valence state prior to polymerization. The reducing agent is preferably carbon monoxide. If a reducing agent other than carbon monoxide is used, higher amounts of comonomer are generally added to the reaction zone to achieve similar amounts of comonomer incorporation into the resulting copolymer. Generally, the activated catalyst is directly subjected to the reducing agent, although intervening steps may be employed. Reduction is preferably carried out at a temperature of from about 300° C. to about 500° C. although, more preferably from about 350° C. to 450° C. The partial pressure of the reducing gas in a reducing operation can be varied from subatmospheric pressures to relatively high pressures, e.g., 500 psia (3.45 MPa). However, a simple reducing operation is to utilize essentially pure carbon monoxide at about atmospheric pressure to up to about 50 psia (345 kPa).

The reduction time can vary from a few minutes to several hours or more. The extent of reduction can be followed by visual inspection of the catalyst system color. The color of the initial activated catalyst system is generally orange, indicating the presence of hexavalent chromium. The color of the reduced catalyst system is blue, indicating that all or essentially all of the initial hexavalent chromium has been reduced to a lower oxidation state, generally the divalent state. After reduction, the reduced supported catalyst system is preferably cooled to about room temperature, i.e., about 25° C., in an inert atmosphere such as argon or nitrogen to flush out the reducing agent. After this flushing treatment, the catalyst system is preferably kept away from contact from either reducing or oxidizing agents.

Polymerization cocatalysts can be used, if desired, but are not necessary. Exemplary cocatalysts include, but are not limited to, metal alkyl, or organometal, cocatalysts, i.e., alkyl boron and/or alkyl aluminum compounds. The term "metal" in organometal is intended to include boron. Often these cocatalysts can alter melt flow characteristics (melt index or high load melt index) of the resultant polymer.

If the cocatalyst is an alkyl boron compound, trihydrocarbylboron compounds are preferred, with trialkyl boron compounds being most preferred. Preferably, the alkyl groups have from 1 to about 12 carbon atoms, and preferably, from 2 to 5 carbon atoms per alkyl group. Trialkyl boron compounds, such as, for example, tri-n-butyl borane, tripropylborane, and triethylboran (TEB) are preferred cocatalysts, according to one embodiment of the invention. Other suitable boron compounds include trihydrocarbyl boron compounds; for example, triaryl boron compounds, such as, for example, triphenylborane; boron alkoxides, such as, for example, $B(OC_2H_5)_3$; and halogenated alkyl boron compounds, such as, for example, $B(C_2H_5)Cl_2$. A preferred cocatalyst is triethylboran.

Other suitable cocatalysts include aluminum compounds of the formula $AlR'_nX_{3-n}$, where X is a hydride or halide, R' is a $C_1$ to $C_{12}$ hydrocarbon, preferably alkyl, and n is an integer of from 1 to 3. Triethylaluminum (TEA) and diethylaluminum chloride (DEAC) are particularly suitable.

A cocatalyst, when used, is preferably used in an amount within a range of from about 1 to about 20 parts per million (ppm), or milligrams per kilogram (mg/kg), based on the mass of the diluent in the reactor. Preferably, the cocatalyst is used in an amount within a range of from 1 to 12 mg/kg. Expressed in other terms, a cocatalyst can be present in an amount so as to give an atom ratio of cocatalyst metal to chromium within a range of from about 0.5:1 to about 10:1, preferably from 2:1 to 8:1. The cocatalyst can be premixed with a catalyst system or added as a separate stream to the polymerization zone, the latter being preferred.

Processes

General Process Conditions and Reactor Systems

This invention pertains to any prepolymerization and/or polymerization process, and the process is suitably carried out over a wide range of temperatures and pressures. Such processes include, for example, loop slurry and stirred tank reactor processes. Either process can be used in combination with a centrifuge, a one-stage flash, a two-stage flash or any combination thereof for recovery of diluent from the polymer product and recirculation of the diluent back in to the polymerization process after any desired purification steps.

Desirably, little to no polymer "swelling" is exhibited as indicated by little or no suppression of the polymer glass transition temperature, Tg, or the melting point, Tm, and/or little or no diluent mass uptake. Thus, polymerization in the diluents of the present invention provides for high polymer concentration to be handled at low viscosity with good heat transfer, reduced reactor fouling, homogeneous polymerization and/or the convenience of subsequent reactions to be run directly on the resulting polymer mixture.

Polymerization processes according to this invention are carried out at any temperature or temperature range effective in carrying out the polymerization process. In general, effective temperatures range from about −80° C. to 350° C., preferably from about 0° C. to 200° C., more preferably from about 50° C. to 120° C.

Polymerization processes according to this invention are carried out at any pressure or pressure range effective in carrying out the polymerization process. The pressures employed may be in the range from 1 mm Hg (133 Pa) to about 3500 bar (350 MPa), preferably from 0.5 bar (50 kPa) to about 500 bar (50 MPa), more preferably from about 1 bar (100 kPa) to about 100 bar (10 MPa), and most preferably from about 5 bar to about 50 bar (5 MPa).

In one embodiment of the invention, olefin(s), preferably $C_2$ to $C_{30}$ olefin(s) or alpha-olefin(s), preferably ethylene, or combinations thereof are prepolymerized in the presence of the chromium catalyst systems of the invention described above prior to the main polymerization. In one embodiment, the prepolymerization process is carried out in a slurry phase at effective prepolymerization temperatures and pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

The prepolymerization and/or polymerization process can be carried out in a batch or continuous process. By continuous is meant a system that operates (or is intended to operate) without interruption or cessation. For example a continuous process to produce a polymer would be one in which the reactants are continuously introduced into one or more reactors and polymer product is continually withdrawn. In a preferred embodiment any of the polymerization process of the invention is a continuous process.

The reactor used in the polymerization process of this invention, will contain sufficient amounts of the catalyst system effective to catalyze the polymerization of the monomer containing feed-stream such that a sufficient amount of polymer having desired characteristics is produced. The feed stream in one embodiment contains a total monomer concentration greater than 5 weight % (based on the total weight of the monomers, diluent, and catalyst system), preferably greater than 15 weight %, greater than 30 weight % in another embodiment. In yet another embodiment, the feed-stream will contain from 5 weight % to 50 weight % monomer concentration based on the total weight of monomer, diluent, and catalyst system (the monomer concentration should be limited sufficiently to prevent pump cavitation).

In one embodiment of the invention, hydrogen is added to the reactor for molecular weight control. As is well known to those skilled in the art, increased concentrations of hydrogen relative to the concentration of monomer(s) in the reactor cause the production of polymer of lower number average and weight average molecular weights.

In one embodiment of the invention, a liquid process is employed, which comprises contacting olefin monomers with polymerization catalyst in an optional solvent and allowing the monomers to react for a sufficient time to produce the desired polymers. Hydrocarbon solvents suitable for the process include aliphatic and aromatic solvents. Alkanes, such as hexane, pentane, isopentane, and octane, are preferred.

Process Conditions

One embodiment of the invention incorporates the use of a slurry phase polymerization process, preferably as a continuous polymerization process. The slurry polymerization process is preferably carried out at pressures in the range of from about 1 to about 100 atmospheres, preferably in the range of from 1 to 50 atmospheres. Operating temperatures are generally in the range of from 0° C. to about 200° C., preferably from 50° C. to about 120° C.

In one embodiment of the slurry process, the monomers, catalyst(s), and initiator(s) are miscible in the diluent or diluent mixture, i.e., constitute a single phase, while the polymer precipitates from the diluent with good separation from the diluent. In one embodiment, a solvent or co-diluent is added to the reaction process. In a particular embodiment, an alkane having from 3 to 7 carbon atoms, preferably a branched alkane, is added. Preferred alkanes include isobutane and isohexane.

A preferred polymerization technique of the invention is referred to as a particle form polymerization, which is essentially a slurry process utilizing a supported catalyst wherein the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and 5,986,021, which are herein fully incorporated by reference. Such combinations of stirred slurry, loop slurry, or stirred and loop slurry reactors are useful for production of bimodal polymers.

In one embodiment, the reactor used in the slurry process of the invention is capable of producing greater than 2000 lbs of polymer per hour (907 kg/hr), more preferably greater than 5000 lbs/hr (2268 kg/hr), and most preferably greater than 10,000 lbs/hr (4540 kg/hr). In another embodiment the slurry reactor used in the process of the invention is capable of producing greater than 15,000 lbs of polymer per hour (6804 kg/hr), preferably greater than 25,000 lbs/hr (11,340 kg/hr) to about 100,000 lbs/hr (45,500 kg/hr).

In one embodiment, polymer granules and supported catalyst particles are present as solid particles in the slurry reactor, and the slurry diluent is a hydrofluorocarbon, one or more hydrocarbons, or mixtures thereof. In one embodiment, the concentration of solid particles in the slurry is equal to or greater than 10 volume percent. In another embodiment, the solid particles are present in the slurry at a concentration equal to or greater than 25 volume percent. In yet another embodiment, the solid particles are present in the slurry at a concentration less than or equal to 75 volume percent. In yet another embodiment, the solid particles are present in the slurry at concentrations ranging from 1 to 70 volume percent; from 5 to 70 volume percent; from 10 to 70 volume percent; from 15 to 70 volume percent; from 20 to 70 volume percent; from 25 to 70 volume percent; from 30 to 70 volume percent; or from 40 to 70 volume percent.

General Process Conditions and Reactor Systems

This invention pertains to any prepolymerization and/or polymerization process, and the process is suitably carried out over a wide range of temperatures and pressures. Such processes include, for example, loop slurry and stirred tank reactor processes. Either process can be used in combination with a centrifuge, a one-stage flash, a two-stage flash or any combination thereof for recovery of diluent from the polymer product and recirculation of the diluent back in to the polymerization process after any desired purification steps.

Desirably, little to no polymer "swelling" is exhibited as indicated by little or no suppression of the polymer glass transition temperature, Tg, or the melting point, Tm, and/or little or no diluent mass uptake. Thus, polymerization in the diluents of the present invention provides for high polymer concentration to be handled at low viscosity with good heat transfer, reduced reactor fouling, homogeneous polymerization and/or the convenience of subsequent reactions to be run directly on the resulting polymer mixture.

Polymerization processes according to this invention are carried out at any temperature or temperature range effective in carrying out the polymerization process. In general, effective temperatures range from about 30° C. to 140° C., preferably from about 40° C. to 125° C., more preferably from about 50° C. to 110° C. The upper temperature will be limited to at least 1° C. below the polymer melting point.

Polymerization processes according to this invention are carried out at any pressure or pressure range effective in carrying out the polymerization process. The pressures employed may be in the range from 1 mm Hg (133 Pa) to about 3500 bar (350 MPa), preferably from 0.5 bar (50 kPa) to about 500 bar (50 MPa), more preferably from about 1 bar (100 kPa) to about 100 bar (10 MPa), and most preferably from about 5 bar to about 50 bar (5 MPa).

In one embodiment of the invention, olefin(s), preferably $C_2$ to $C_{30}$ olefin(s) or alpha-olefin(s), preferably ethylene, or combinations thereof are prepolymerized in the presence of the chromium catalyst systems of the invention described above prior to the main polymerization. In one embodiment, the prepolymerization process is carried out in a slurry phase at effective prepolymerization temperatures and pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

The prepolymerization and/or polymerization process can be carried out in a batch or continuous process. By continuous is meant a system that operates (or is intended to operate) without interruption or cessation. For example a continuous process to produce a polymer would be one in which the reactants are continuously introduced into one or more reactors and polymer product is continually withdrawn.

The reactor used in the polymerization process of this invention, will contain sufficient amounts of the catalyst system effective to catalyze the polymerization of the monomer containing feed-stream such that a sufficient amount of polymer having desired characteristics is produced. The feed stream in one embodiment contains a total monomer concentration greater than 5 weight % (based on the total weight of the monomers, diluent, and catalyst system), preferably greater than 15 weight %, greater than 30 weight % in another embodiment. In yet another embodiment, the feed-stream will contain from 5 weight % to 50 weight % monomer concentration based on the total weight of monomer, diluent, and catalyst system (the monomer concentration should be limited sufficiently to prevent pump cavitation).

In one embodiment of the invention, hydrogen is added to the reactor for molecular weight control. As is well known to those skilled in the art, increased concentrations of hydrogen relative to the concentration of monomer(s) in the reactor cause the production of polymer of lower number average and weight average molecular weights.

In one embodiment of the invention, a liquid process is employed, which comprises contacting olefin monomers with polymerization catalyst in an optional solvent and allowing the monomers to react for a sufficient time to produce the desired polymers. Hydrocarbon solvents suitable for the process include aliphatic and aromatic solvents. Alkanes, such as hexane, pentane, isopentane, and octane, are preferred.

Process Conditions

One embodiment of the invention incorporates the use of a slurry phase polymerization process, preferably as a continuous polymerization process. The slurry polymerization process is preferably carried out at pressures in the range of from about 1 to about 100 atmospheres, preferably in the range of from 1 to 50 atmospheres. Operating temperatures are generally in the range of from 0° C. to about 200° C., preferably from 50° C. to about 120° C. Preferably, the polymerization temperature is above room temperature (23° C.), preferably above 25° C., preferably above 27° C., preferably above 30° C., preferably above 50° C., preferably above 70° C.

In one embodiment of the slurry process, the monomers, catalyst(s), and initiator(s) are miscible in the diluent or diluent mixture, i.e., constitute a single phase, while the polymer precipitates from the diluent with good separation from the diluent. In one embodiment, a solvent or co-diluent is added to the reaction process. In a particular embodiment, an alkane having from 3 to 7 carbon atoms, preferably a branched alkane, is added. Preferred alkanes include isobutane and isohexane.

A preferred polymerization technique of the invention is referred to as a particle form polymerization, which is essentially a slurry process utilizing a supported catalyst wherein the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and 5,986,021, which are herein fully incorporated by reference.

In one embodiment, the reactor used in the slurry process of the invention is capable of producing greater than 2000 lbs of polymer per hour (907 kg/hr), more preferably greater than 5000 lbs/hr (2268 kg/hr), and most preferably greater than 10,000 lbs/hr (4540 kg/hr). In another embodiment the slurry reactor used in the process of the invention is capable of producing greater than 15,000 lbs of polymer per hour (6804 kg/hr), preferably greater than 25,000 lbs/hr (11,340 kg/hr) to about 100,000 lbs/hr (45,500 kg/hr).

In one embodiment, polymer granules and supported catalyst particles are present as solid particles in the slurry reactor, and the slurry diluent is a hydrofluorocarbon, one or more hydrocarbons, or mixtures thereof. In one embodiment, the concentration of solid particles in the slurry is equal to or greater than 10 volume percent. In another embodiment, the solid particles are present in the slurry at a concentration equal to or greater than 25 volume percent. In yet another embodiment, the solid particles are present in the slurry at a concentration less than or equal to 75 volume percent. In yet another embodiment, the solid particles are present in the slurry at concentrations ranging from 1 to 70 volume percent; from 5 to 70 volume percent; from 10 to 70 volume percent; from 15 to 70 volume percent; from 20 to 70 volume percent;

from 25 to 70 volume percent; from 30 to 70 volume percent; or from 40 to 70 volume percent.

Reactors and Reactor Systems

One or more slurry reactors in series or in parallel may be used in this invention. Alternatively, one or more gas phase reactors my be operated either upstream or downstream of the one or more slurry reactors. Catalyst component(s) (and any activator employed) may be delivered as a solution or slurry, either separately to the reactor, activated in-line just prior to the reactor, or preactivated and pumped as an activated solution or slurry to the reactor. A preferred operation is two solutions activated in-line. For information on methods to introduce multiple catalysts into reactors, see U.S. Pat. No. 6,399,722 and WO 01/30861 A1. While these reference may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst component may also be added to both reactors, with one component being added to a first reactor and other components added to other reactors.

In one embodiment, a continuous flow stirred tank-type reactor is used. The reactor is generally fitted with an efficient agitation means, such as a turbo-mixer or impeller(s), an external cooling jacket and/or internal cooling tubes and/or coils, or other means of removing the heat of polymerization to maintain the desired reaction temperature, inlet means (such as inlet pipes) for monomers, diluents and catalysts (combined or separately), temperature sensing means, and an effluent overflow or outflow pipe which withdraws polymer, diluent and unreacted monomers among other things, to a holding drum or quench tank. Preferably, the reactor is purged of air and moisture. One skilled in the art will recognize proper assembly and operation. The reactors are preferably designed to deliver good mixing of the catalyst and monomers within the reactor, good turbulence across or within the heat transfer tubes or coils, and enough fluid flow throughout the reaction volume to avoid excessive polymer accumulation or separation from the diluent.

In another embodiment of the invention, a reactor capable of performing a continuous slurry process, such as disclosed in U.S. Pat. No. 5,417,930, herein incorporated by reference, is used. A reactor pump impeller is employed in the reactor and can be of the up-pumping variety or the down-pumping variety.

The order of contacting the monomer feed-stream, catalyst, initiator, and diluent may be variable. In one embodiment, the initiator and catalyst are pre-complexed by mixing together in the selected diluent for a prescribed amount of time ranging from 0.01 second to 10 hours, and then is injected into a continuous reactor through a catalyst nozzle or injection apparatus. In yet another embodiment, catalyst and the initiator are added to the reactor separately. In another embodiment, the initiator is blended with the feed monomers before injection to the reactor. Desirably, the monomer is not contacted with the catalyst, or the catalyst combined with the initiator before entering the reactor.

In another embodiment of the invention, the initiator and catalyst are allowed to pre-complex by mixing together in the selected diluent at temperatures between −40° C. and the freezing point temperature of the diluent, with a contact time between 0.01 seconds and several hours, and between 0.1 seconds and 5 minutes, preferably less than 3 minutes, preferably between 0.2 seconds and 1 minute before injection into the reactor.

In yet another embodiment of the invention, the initiator and catalyst are allowed to pre-complex by mixing together in the selected diluent at temperatures between −80° C. and 150° C., typically between −40° C. and the desired reaction temperature, typically between −40° C. and 120° C.

The overall residence time in the reactor can vary, depending upon, for example, catalyst activity and concentration, monomer concentration, feed injection rate, production rate, reaction temperature, and desired molecular weight. Residence time will generally be between about a few seconds and five hours, and typically between about 10 and 60 minutes. A variable influencing residence time is the monomer and diluent feed injection rates and the overall reactor volume.

According to another embodiment of the invention, the process can be carried out in a loop reactor or a stirred tank reactor. Withdrawal of polymer product from the reactor can be accomplished by concentrating the solids for intermittent withdrawal or by continuous withdrawal of a portion of the slurry. Intermittent withdrawal is typically driven by a difference between the density of the polymer product and the density of the diluent. In a particular embodiment, polymerization slurry is circulated within a loop reactor by multiple pumps. Typically in such an embodiment, the reactor volume is greater than 20,000 gallons (75.7 kiloliters).

The overall residence time in the reactor can vary, depending upon, for example, catalyst activity and concentration, monomer concentration, feed injection rate, production rate, reaction temperature, and desired molecular weight. Residence time will generally be between about a few seconds and five hours, and typically between about 10 and 60 minutes. A variable influencing residence time is the monomer and diluent feed injection rates and the overall reactor volume.

In one embodiment of the invention, the reactor is operated at a space time yield greater than 2.6 lbs/hr-gal (0.316 kg/hr-l). Alternatively, the reactor is operated at a space time yield greater than 3.0 lbs/hr-gal (0.360 kg/hr-l), alternatively greater than 3.3 lbs/hr-gal (0.395 kg/hr-l).

In another embodiment, polymerization slurry in the reactor has a volume percent solids greater than 50. Preferably, the volume percent solids in the polymerization slurry in the reactor is greater than 60, more preferably the volume percent solids in the polymerization slurry in the reactor is greater than 70. The volume percent solids in the reactor is measured by visually observing the solids level of a representative captive sample of the reaction mixture which was allowed to settle at saturation pressure in a sight glass. In this measurement method, the volume percent solids is determined by observing the height of the settled polymer particles in the sight glass and dividing this observed height by the height of the total captive sample of the reaction mixture, and wherein the cross sectional area of the sight glass containing the captive sample is the same as the cross sectional area of the vertical pipe of the pipe-loop reactor.

Product Recovery

Polymer product that leaves the reactor unit of the reaction system contains entrained material that should be separated from the polymer. Included in this polymer product are unreacted monomers and undesirable hydrocarbon by-products of the reaction process. Also included are any diluent and/or solvent materials that are not reactive to form desirable polymer, and are especially problematic with regard to removal and/or recovery.

A substantial portion (i.e., a majority) of the polymer product is separated from the non-polymer product by sending product effluent from the polymer reactor to a polymer recovery system. The polymer recovery system is operated by controlling a variety of parameters including temperature, pressure, vapor-liquid separation systems, and purge systems or vessels.

In one embodiment, the polymer recovery system incorporates the use of an inert gas to purge or scrub out undesirable entrained material from the polymer product. The inert gas is a composition that is substantially non-reactive with the polymer product, and can be used in sufficient quantity as a driving force to separate the non-polymer components from the polymer product. Examples of useful inert gases include air and nitrogen.

In a particular embodiment, polymer associated with entrained materials such as unreacted monomer, hydrocarbon by-product and diluent such as hydrofluorocarbon is recovered from a polymerization reaction process and sent to a polymer recovery system. Preferably, the polymer recovery system includes a purge system or vessel, more preferably a purge bin, and the polymer and associated entrained materials are sent to the purge system. The inert gas composition is then input into the purge system to purge or drive out the entrained materials, thereby forming a purge stream, which is recovered from the purge system.

Entrained, non-polymer product material that is separated and recovered as a purge stream from the polymer product is preferably further separated into component fractions or a plurality of streams and each fraction or stream stored, recycled or vented from the system as appropriate. It is preferred that diluent and unreacted monomer be separated and returned to the reactor. These streams can be separated and recovered as individual streams or as a combined stream. If in inert gas is used in the recovery system, it is preferred that the inert gas also be separated, preferably as an individual stream, and recovered for reuse in the polymer recovery system and/or in the reaction portion of the polymerization system.

In one embodiment, the effluent from the polymerization reactor is flashed in a first flash to vaporize from about 50% to about 100% of the liquid medium to produce concentrated polymer effluent and vaporized liquid. Flashing can be accomplished by reducing pressure or by heating. Preferably, the vapor obtained in the first flash is condensed, more preferably the vapor is condensed without compression, and most preferably is compressed by heat exchange. Preferably, the first flash is operated at from about 140 psia (965 kPa) to about 315 psia (2172 kPa).

In another embodiment, polymer solids are discharged from a first flash to a second flash through a seal chamber. The seal chamber preferably is of sufficient dimension such as to maintain a volume of polymer solids/slurry in the seal chamber sufficient to maintain a pressure seal.

In another embodiment, concentrated polymer effluent and vaporized liquid are continuously separated. In a preferred aspect, the concentrated polymer effluent slurry is flashed in a second flash to vaporize liquid.

In one embodiment of the invention, the polymerization effluent from the polymerization reactor is heated and then sent to a flash operation. Preferably, the polymerization effluent is heated to a temperature below the fusion temperature of the polymer. The quantity of heat supplied to the polymerization effluent is preferably at least equal to that quantity of heat which equals the heat of vaporization of the liquid medium which is to be flashed.

The polymer solids can be separated by any appropriate physical means as well. One non-limiting example is to separate the polymer solids from the diluent using a centrifuge apparatus.

Polymer Products

General Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, multimodal or bimodal high molecular weight polyethylenes, polypropylene and polypropylene copolymers.

Density

The polymers produced according to this invention can be produced at any density suitable for the appropriate end use. In one embodiment, there can be produced ethylene based polymers having a density in the range of from 0.86 g/cc to 0.97 g/cc. For some applications, a density in the range of from 0.88 g/cc to 0.920 g/cc is preferred while in other applications, such as pipe, film and blow molding, a density in the range of from 0.930 g/cc to 0.965 g/cc is preferred. For low density polymers, such as for film applications, a density of 0.910 g/cc to 0.940 g/cc is preferred. Density is measured in accordance with ASTM method 1505.

Molecular Weight and Molecular Weight Distribution

The polymers produced by the process of the invention can be produced in a wide variety of molecular weights and molecular weight distributions. Molecular weights (weight average molecular weight (Mw) and number average molecular weight (Mn)) are preferably determined using a Waters 150 Size Exclusion Chromatograph (SEC) equipped with a differential refractive index detector (DRI), an online low angle light scattering (LALLS) detector and a viscometer (VIS). The details of the detector calibrations are described by T. Sun, P. Brant, R. R. Chance, and W. W. Graessley, *Macromolecules*, Volume 34, Number 19, 6812-6820, (2001), and are incorporated herein by reference.

The polymers produced by the process of the invention can be used in a wide variety of products and end-use applications. Preferred polymers produced herein may have an $M_n$ (number-average molecular weight) value from 300 to 1,000,000, or between from 700 to 300,000. For low weight molecular weight applications, such as those copolymers useful in lubricating and fuel oil compositions, an $M_n$ of 300 to 20,000 is contemplated, or less than or equal to 10,000.

In one embodiment, the polymer produced has a weight average molecular weight (Mw) of 40,000 or more, preferably 60,000 or more, preferably 100,000 or more, preferably 120,000 or more, preferably 150,000 or more. For LLDPE cast grade films a weight average molecular weight of 40,000 or more is preferred while a weight average molecular weight of 60,000 or more is preferred for blown film grades.

In an embodiment of the invention, the polymers produced have a molecular weight distribution (MWD), which is defined as a ratio of weight average molecular weight to number average molecular weight (MWD=$M_w/M_n$), of greater than 1.5 to about 70. In some embodiments, the polymer has a $M_w/M_n$ of from about 2 to 60, while in other embodiments the polymer produced has a $M_w/M_n$ of from about 5 to 50.

In another embodiment, the polyolefin produced has at least two species of molecular weights. Preferably, both species are present at greater than 20 weight %, based upon deconvolution analysis of GPC molecular weight distribution.

Melt Index

The polymers produced by the process of the invention can be produced according to a desired or predetermined melt index, depending upon desired end use. In one embodiment, the polymers have a melt index (MI) or ($I_2$), as measured by ASTM-D-1238-E, in the range from 0.01 dg/min to 1000 dg/min, more preferably from about 0.01 dg/min to about 100 dg/min, even more preferably from about 0.01 dg/min to about 50 dg/min, and most preferably from about 0.1 dg/min to about 10 dg/min.

The polymers of the invention in a preferred embodiment have a melt index ratio of from preferably greater than 25, more preferably greater than 30, even more preferably greater that 40, still even more preferably greater than 50 and most preferably greater than 65. In another embodiment, the polymer of the invention has a narrow molecular weight distribution and a broad composition distribution or vice-versa.

These polymer products are also characterized as having at least 10 ppm of residual fluorine present, preferably between 10 and 10,000 ppm of fluorine present, preferably between 10 and 1000 ppm.

Applications

Polymers produced by the process of the invention and blends thereof are useful in producing any variety of articles. For example, the polymers are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

Test Methods

The melt index (MI) was measured in accordance with ASTM D 1238 (190° C., 2.16 kg), the melt index ratio (MIR) was determined from the ratio of the MI measurements at (190° C., 21.6 kg) to that at (190° C., 2.16 kg). Measurements were started after about 6½ minutes.

Density

Density in g/cc is determined in accordance with ASTM 1505 and ASTM D-1928, procedure C, plaque preparation. A plaque is made and conditioned for one hour at 100° C. to approach equilibrium crystallinity, measurement for density is then made in a density gradient column.

GPC Method—Gel Permeation Chromatography—DRI Only

This method uses a Waters 150C C GPC gel permeation chromatograph equipped with a Waters differential refractometer that measures the difference between the refractive index of the solvent and that of the solvent containing the fractionated polymer. The system was used at 145° C. with 1,2,4-Trichlorobenzene (TCB) as the mobile phase that was stabilized with ~250 ppm of butylated hydroxy toluene (BHT). The flow rate used was 0.5 mL/min. Three (Polymer Laboratories) PLgel Mixed-B columns were used. This technique is discussed in "Macromolecules, Vol. 34, No. 19, pp. 6812-6820" which is incorporated herein by reference.

The separation efficiency of the column set was calibrated using a series of narrow MWD polystyrene standards, which reflects the expected MW range for samples and the exclusion limits of the column set. At least 10 individual polystyrene standards, ranging from Mp ~580 to 10,000,000, were used to generate the calibration curve. The polystyrene standards are obtained from Polymer Laboratories (Amherst, Mass.) or an equivalent source. To assure internal consistency, the flow rate is corrected for each calibrant run to give a common peak position for the flow rate marker (taken to be the positive inject peak) before determining the retention volume for each polystyrene standard. The flow marker peak position thus assigned was also used to correct the flow rate when analyzing samples; therefore, it is an essential part of the calibration procedure. A calibration curve (log Mp vs. retention volume) is generated by recording the retention volume at the peak in the DRI signal for each PS standard, and fitting this data set to a 2nd-order polynomial. Polystyrene standards were graphed using Viscotec 3.0 software. Samples were analyzed using WaveMetrics, Inc. IGOR Pro and Viscotec 3.0 software using updated calibration constants.

A preferred procedure used in the present application for Differential Scanning Calorimetry (DSC) is described as follows. Peak melting point (Tm), peak crystallization temperature (Tc), heat of fusion and crystallinity were determined using the following procedure according to ASTM E 794-85. Differential scanning calorimetric (DSC) data was obtained using a TA Instruments model 2920 machine. Samples weighing approximately 7-10 mg were sealed in aluminum sample pans. The DSC data was recorded by first cooling the sample to −50° C. and then gradually heating it to 200° C. at a rate of 10° C./minute, called first melt. The sample was kept at about 200° C. for 5 minutes before a second cooling-heating cycle was applied. During the second cycle, the sample was cooled from 200° C. to −50° C. at a rate of 10° C./minute, called second cool, and then kept at −50° C. for 5 minutes and heated to 200° C. at a rate of 10° C./minute, called second melt. All the thermal events in both the first and second cycle were recorded. The melting temperature ($T_m$) was the peak temperature of the melting curve and the crystallization temperature ($T_c$) was the peak temperature of the cooling peak. Tm, Tc and heat of fusion were obtained from the thermal events in the second melt and second cool unless otherwise noted.

Crystallinity: Weight percent degree of crystallinity is calculated from the measured density of the sample and known densities of crystalline and amorphous polyethylene according to the equation: $100 \times (1/\rho - 1/\rho_a)/(1/\rho_c - 1/\rho_a)$, as described in the *Handbook of Polyethylene*, published by Marcel Dekker, Inc. In this calculation, $\rho$ is the measured sample density, $\rho_c$ is the unit cell crystalline density, and $\rho_a$ is the amorphous density. The value of $\rho_c$ is taken to be 1.000 g/cm³, while the value of $\rho_a$ is commonly accepted as 0.853 g/cm³.

Experimental-Polymerizations (Tables 1-4)

The following experimental examples demonstrate that the slurry phase polymerization of ethylene with supported chromium catalysts is enabled with diluents consisting of varying levels of heteroatom (i.e. not pertaining to C or H) incorporation. These diluents can possess a range of boiling points depending on their composition and molecular weight.

For the examples below, the heteroatomic nature of the diluent is defined as:

atoms per molecule excluding C and H/total # of atoms.

Thus, for a conventional hydrocarbon diluent, this value is equal to zero.

Table 1 Below Lists Examples of Conventional and Heteroatom Containing Diluents

| Diluent | Heteroatomic Nature | Boiling Point (C.) |
|---|---|---|
| n-hexane | 0.0 | 69 |
| Isobutane | 0.0 | −12 |
| Perfluorohexane | 0.7 | 59 |
| Perfluorobutane | 0.7 | −2 |
| Perfluorocyclobutane | 0.7 | −5.8 |
| 1,1,1,2,3,3,3 heptafluoropropane (HFC-227ea) | 0.64 | −15.2 |
| 1,1,1,3,3,3 hexafluoropropane (HFC-236fa) | 0.55 | −1 |
| 1,1,1,2,3,3 hexafluoropropane (HFC-236ea) | 0.55 | 6.5 |
| 1,1,1,3,3 hexafluoropropane (HFC-245fa) | 0.45 | 15 |
| 2-Fluoropropane (HFC-281) | 0.09 | −2.5 |

In the following slurry phase experiments pressure is reported in atmospheres and pounds per square inch. The conversion factors to S.I. Units are; 1 psi equals 6.894757 kPa and 1 atm equals 101.325 kPa.

Feed and Co-monomer

Polymerization grade ethylene was used and further purified by passing it through a series of columns: 500 cc Oxyclear cylinder from Labdlear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company.

98+% 1-hexene was obtained from Alfa-Aesar and further purified by filtration through basic alumina (Aldrich Chemical Company, Brockman Basic 1) into a vessel containing activated 3A molecular sieve.

Catalysts

Supported chromium catalyst 969MPI was obtained from W.R. Grace & Co. The catalyst was activated at 815° C. before use.

Scavenger/Co-catalyst

Dibutyl magnesium (DBM) was obtained from Aldrich as 1M in heptanes, and used without further purification.

Diluents 1,1,1,3,3,3 hexafluoropropane (HFC-236fa) was obtained from DuPont. 1,1,1,3,3 pentafluoropropane (HFC-245fa) was obtained from Honeywell, Perfluorohexane, and perfluorocyclobutane were obtained from SynQuest Laboratories, Inc. Polymerization grade isobutane was also used.

All above diluents were purified by passing through a series of purification materials in the order of Molecular Sieve 3A (obtained from Aldrich Chemical Company), Molecular Sieve 13X (obtained from Aldrich Chemical Company), and Selexsorb CD (obtained from Aldrich Chemical Company) prior to being used as a polymerization medium.

Polymerization grade hexane was used and further purified by passing it through a series of columns: 500 cc Oxyclear cylinder from Labdlear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company.

Reactor Description and Preparation

Polymerizations were conducted in an inert atmosphere ($N_2$) drybox using autoclaves equipped with an external heater for temperature control, glass inserts (internal volume of reactor=22.5 mL), septum inlets, regulated supply of nitrogen, hydrogen/nitrogen mixture, and ethylene, and equipped with disposable PEEK mechanical stirrers (400 RPM). The autoclaves were prepared by purging with dry nitrogen at 110° C. or 115° C. for 5 hours and then at 25° C. for 5 hours.

Ethylene/1-hexene Copolymerization: The reactor was prepared as described above, and then purged with ethylene. The reactors were heated to 40° C. and ethylene was first charged to the reactor.

Diluents with boiling points below room temperature were pressurized to approximately 80 psig (552 kPag) at ambient temperature to maintain them in the liquid phase and were subsequently added to the reactor via syringe. Higher boiling point diluents were added at ambient temperature and pressure via syringe. The amount of each diluent added at 40° C. was calculated to give approximately the same volumetric amount for all diluents (~4 mL) at the polymerization temperature to be studied. Therefore, an amount in excess of 4 mL was added to compensate for evaporative losses due to vapor pressure generation in the headspace above the diluent.

A solution of 1-hexene and scavenger/co-catalyst at room temperature and pressure was next added to the reactors via syringe. The reactors were then brought to process temperature (105° C.) while stirring at 400 RPM. Once at process temperature, ethylene delivery pressure for polymerization was set to the pressure generated by the components (ethylene, diluent, co-monomer, scavenger/co-catalyst) in the reactor. Reaction conditions for each test are included in Table 2.

The supported catalyst was stirred in toluene at ambient temperature and pressure and added to the reactors (at process temperature and pressure) via syringe as a slurry to initiate polymerization. Amounts of all reagents, diluents, catalysts and co-catalysts are given in Table 3.

In the nature the solutions and catalyst slurry are added via syringe, a hexanes solution is also injected via the same syringe following their addition to insure that minimal solution or slurry is remaining in the syringe. This procedure is applied after the addition of the 1-hexene/scavenger/co-catalyst solution as well as the catalyst slurry. Thus, in each case, the diluent mixture at reaction conditions consists of approximately 15 volume percent hexane as well.

Ethylene was allowed to enter (through the use of computer controlled solenoid valves) the autoclaves during polymerization to maintain reactor gauge pressure (+/−2 psig (13.8 kPag)). Reactor temperature was monitored and typically maintained within +/−1° C. Polymerizations were halted by addition of approximately 400 psig (2758 kPa) $O_2$/Ar (5 mole % $O_2$) gas mixtures to the autoclaves for approximately 30 seconds. The polymerizations were quenched after a predetermined cumulative amount of ethylene had been added or for a maximum of 45 minutes polymerization time. The final quench time for each run is listed in Table 4. The reactors were cooled and vented. The polymer was isolated after the remaining reaction components were removed in-vacuo. Four experiments were conducted with each condition tested.

Yields reported include total weight of polymer and residual catalyst. Catalyst productively is reported as grams of polymer per gram of catalyst per hour of reaction time (g/g·hr). Yields and catalyst productivity are listed in Table 4 for all four experiments at each condition.

TABLE 2

Amounts charged to reactors

| Example | Diluent | Amt (mL) | C6= (μL) | DMB (μmol) | Catalyst (μg) |
|---|---|---|---|---|---|
| A | n-Hexane | 4.0 | 80 | 5 | 300 |
| B | Isobutane | 5.3 | 50 | 5 | 300 |
| C | 1,1,1,3,3,3 hexafluoropropane (HFC-236fa) | 5.2 | 80 | 5 | 300 |
| D | Perfluorocyclobutane | 4.9 | 80 | 5 | 300 |
| E | Perfluorohexane | 4.25 | 50 | 5 | 300 |
| F | 1,1,1,3,3 pentafluoropropane (HFC-245fa) | 4.70 | 50 | 5 | 300 |

TABLE 3

Reaction Conditions

| Example | Temperature (C.) | Pressure (psig/kPag) |
|---|---|---|
| A | 105 | 150/1034 |
| B | 105 | 440/3034 |
| C | 105 | 390/2689 |
| D | 105 | 395/2723 |
| E | 105 | 440/3034 |
| F | 105 | 440/3034 |

TABLE 4

Results

| Example | Experiment # | Yield (g) | Quench time (s) | Productivity (g/g h) |
|---|---|---|---|---|
| A | 1 | 0.021 | 2701.95 | 93.3 |
|   | 2 | 0.021 | 2702.32 | 93.3 |
|   | 3 | 0.02  | 2701.35 | 88.8 |
|   | 4 | 0.021 | 2701.66 | 93.3 |
| B | 1 | 0.037 | 933.799 | 475.5 |
|   | 2 | 0.037 | 885.82  | 501.2 |
|   | 3 | 0.037 | 862.721 | 514.7 |
|   | 4 | 0.042 | 960.23  | 524.9 |
| C | 1 | 0.0801 | 3601.21 | 266.9 |
|   | 2 | 0.101  | 3600.32 | 336.6 |
|   | 3 | 0.0944 | 3600.77 | 314.6 |
|   | 4 | 0.087  | 3601.21 | 289.9 |
| D | 1 | 0.018 | 2700.48 | 80.0 |
|   | 2 | 0.017 | 2700.55 | 75.5 |
|   | 3 | 0.017 | 2702.32 | 75.5 |
|   | 4 | 0.018 | 2700.28 | 80.0 |
| E | 1 | 0.061 | 2701.4  | 270.97 |
|   | 2 | 0.058 | 2700.6  | 257.72 |
|   | 3 | 0.063 | 2701.51 | 279.84 |
|   | 4 | 0.062 | 2701.211 | 275.43 |
| F | 1 | 0.085 | 2318.32 | 440.0 |
|   | 2 | 0.084 | 1913.9  | 526.7 |
|   | 3 | 0.085 | 1682.299 | 606.3 |
|   | 4 | 0.092 | 1966.23 | 561.5 |

The results illustrate that productivity for ethylene polymerization on supported chromium catalysts is enabled for a slurry process in a variety of diluents with heteroatomic character in addition to conventional diluents of hexane and isobutane.

Experimental-Polymerizations (Table 5)

Starting Materials

Catalyst: Supported chromium catalyst HA30W can be obtained from W.R. Grace & Co. The catalyst was activated at 815° C. before use.

1-hexane: The 1-hexene comonomer was obtained from Alfa Aesar, their stock number 31648, and was purified prior to use by passing it through a column of activated aluminum oxide, obtained from Aldrich Chemical Company (their part Number 19,944-3). Before use, the activated aluminum oxide was placed in a vacuum oven at 200° C., and vacuum was applied at least over night.

Dibutyl Magnesium (DBM): The DBM was obtained as a 1M solution in hexane from Aldrich Chemical Company (their part number 34,511-3) and was diluted with hexane to 0.1M before use.

Hexane: The hexane used to dilute the DBM was obtained from Aldrich Chemical Company (their part number 29,609-0). It was used as received.

Isobutane: The isobutane was passed through a series of purification columns on the way to the reactor. The columns were (sequentially): 13X molecular sieves, Selexsorb CD alumina, Selexsorb COS alumina, and Oxyclear column. The 13X mole sieves were 8-12 mesh and were obtained from Aldrich Chemical Company (their part number 20,864-7). The Selexsorb CD alumina (7×14 mesh, no part number) and Selexsorb COS (7×14 mesh, no part number) were manufactured by Alcoa Chemical company. The Oxyclear column was obtained from Lab Clear, 508 29th Avenue, Oakland Calif. 94601, part number RGP-R1-1000.

Ethylene: The ethylene was a polymerization grade and was passed through a series of purification columns on the way to the reactor. The columns were (sequentially): 3A molecular sieves, Selexsorb CD alumina, Selexsorb COS alumina, and Oxyclear column. The 3A mole sieves were 8-12 mesh and were obtained from Aldrich Chemical Company (their part number 20,858-2). The Selexsorb CD alumina (7×14 mesh, no part number) and Selexsorb COS (7×14 mesh, no part number) were manufactured by Alcoa Chemical company. The Oxyclear column was obtained from Lab Clear, 508 29th Avenue, Oakland Calif. 94601, part number RGP-R1-1000.

HFC-236fa: (1,1,2,3,3,3,-hexafluoropropane) The HFC-236fa was obtained from DuPont, marketed as SUVA 236fa. The HFC-236fa was passed through purification columns containing 3A mole sieves, 13X mole sieves, and Selexsorb CD alumina. The 13X mole sieves were 8-12 mesh and were obtained from Aldrich Chemical Company (their part number 20,864-7). The other packing materials were the same as those for the ethylene purification (described above).

EXAMPLES

Experimental runs were conducted in a lab-scale, 2-liter slurry polymerization reactor using the described diluents in Tables 1 and 5. The catalyst used was as described above. The scavenger was Dibutyl magnesium (DBM). Ethylene and 1-hexene were used as comonomers. All experiments were carried out at a reaction temperature of 103.3° C. to 110.0° C. and for the time indicated in Table 5. The 1-hexene and diluent were purified prior to reaction by passing the purification systems as described above.

For each experiment, the reactor was purged with nitrogen, followed by the addition of the DBM solution (0.1 molar), 0 to 48 cc of 1-hexene and then 750 cc of diluent was added. The temperature was raised to the desired level as shown in Table 5, and ethylene gas was added to raise the system pressure to approximately 415 psig. Then the catalyst was then flushed in with 250 ml of additional diluent to initiate reaction and the ethylene pressure was also increased as quickly as possible to 470 psig.

During the reaction, the system temperature was maintained at the listed temperature by means of an external steam and cooling water control system, and the pressure was maintained at 470 psig by means of an ethylene make-up system. (As the ethylene was consumed by reaction, additional ethylene was added to the system automatically to hold the reactor pressure at 470 psig.) The reaction was maintained for the time indicated, at which time the reactor was vented to terminate the reaction. The reactor was then opened, and the polymer product collected for analysis. Depending on the experiment, the polymer product consisted of granular resin and/or foulant material. The granular material was poured from the reactor, and the foulant material was scraped off of the reactor walls and slurry agitator. The granular material and foulant were individually weighed and analyzed for weight percent fouling, productivity (PD), density, melt index ($MI_2$ and $MI_{21}$), melt flow ratio (MFR=$MI_{21}/MI_2$), and polydispersity index (PDI=weight average molecular weight divided by number average molecular weight). Results are given in Table 5.

TABLE 5

| Sample # | Diluent | Temp (C.) | Temp (F.) | Hexene Charge (ml) | Cat. Charge (mg) | DBM (mmol) | Induction Time (min) | Run Time (min) | Melt Index (I2) |
|---|---|---|---|---|---|---|---|---|---|
| 86 | IC4 | 103.3 | 217.9 | 0.0 | 56.0 | 0.1 | 5.50 | 44.50 | 0.111 |
| 90 | HFC-236fa | 103.3 | 217.9 | 0.0 | 160.0 | 0.3 | 8.25 | 41.00 | 0.024 |
| 94 | IC4 | 107.8 | 226.0 | 0.0 | 57.0 | 0.1 | 3.50 | 77.00 | 0.268 |
| 96 | HFC-236fa | 107.8 | 226.0 | 0.0 | 156.0 | 0.3 | 7.10 | 49.40 | 0.050 |
| 98 | HFC-236fa | 107.8 | 226.0 | 4.0 | 154.0 | 0.3 | 5.00 | 33.00 | 0.289 |
| 100 | HFC-236fa | 107.8 | 226.0 | 12.0 | 149.0 | 0.3 | 5.00 | 34.80 | 0.967 |
| 102 | HFC-236fa | 107.8 | 226.0 | 48 | 151 | 0.3 | 5.75 | 17.00 | — |
| 104 | HFC-236fa | 107.8 | 226.0 | 24 | 157 | 0.3 | 6.70 | 23.30 | — |
| 106 | IC4 | 110.0 | 230.0 | 0 | 56 | 0.1 | 4.50 | 104.50 | 0.470 |
| 108 | IC4 | 115.0 | 239.0 | 0 | 92 | 0.2 | 4.80 | 55.20 | 1.22 |
| 110 | IC4 | 112.8 | 235.0 | 0 | 51 | 0.3 | 4.00 | 56.00 | 0.316 |
| 114 | IC4 | 110.5 | 230.9 | 0 | 148 | 0.3 | 3.10 | 49.90 | 1.83 |
| 116 | IC4 | 110.5 | 230.9 | 0 | 55 | 0.3 | 3.30 | 56.70 | 1.86 |
| 124 | IC4 | 107.8 | 226.0 | 4 | 60 | 0.3 | 3.60 | 56.40 | 2.32 |
| 128 | IC4 | 107.8 | 226.0 | 0.25 | 49 | 0.1 | 3.50 | 44.50 | 0.550 |
| 135 | IC4 | 103.3 | 217.9 | 0 | 58 | 0.1 | 6.10 | 52.90 | 0.044 |
| 137 | HFC-236fa | 107.8 | 226.0 | 18 | 149 | 0.3 | 5.40 | 33.40 | 0.887 |
| 141 | HFC-236fa | 107.8 | 226.0 | 21 | 151 | 0.3 | 4.80 | 55.20 | NES |
| 143 | HFC-236fa | 110.0 | 230.0 | 0 | 154 | 0.3 | 3.60 | 16.40 | — |
| 144 | IC4 | 103.3 | 217.9 | 0 | 55 | 0.1 | 3.90 | 56.10 | 0.090 |
| 146 | IC4 | 103.3 | 217.9 | 0 | 53 | 0.1 | 3.90 | 56.10 | 0.070 |
| 148 | IC4 | 103.3 | 217.9 | 0.0 | 56.0 | 0.1 | 4.00 | 47.30 | 0.098 |
| 154 | IC4 | 103.3 | 217.9 | 0.0 | 56.0 | 0.1 | 4.00 | 56.00 | 0.127 |
| 156 | IC4 | 103.3 | 217.9 | 0.0 | 56.0 | 0.1 | 4.20 | 43.60 | 1.22 |
| 1 | HFC-236fa | 107.8 | 226.0 | 18.0 | 151.0 | 0.3 | 7.00 | 23.00 | — |
| 3 | IC4 | 103.3 | 217.9 | 0.0 | 54.0 | 0.1 | 4.20 | 53.60 | 0.057 |
| 4 | IC4 | 103.3 | 217.9 | 0.0 | 60.0 | 0.1 | 4.00 | 51.20 | 0.084 |
| 5 | IC4 | 103.3 | 217.9 | 0.0 | 48.0 | 0.1 | 4.50 | 55.50 | 0.066 |
| 6 | IC4 | 103.3 | 217.9 | 0.0 | 53.0 | 0.1 | 5.20 | 54.80 | 0.078 |
| 7 | IC4 | 103.3 | 217.9 | 0.0 | 51.0 | 0.1 | 4.90 | 39.90 | 0.084 |
| 9 | IC4 | 110.0 | 230.0 | 0.0 | 53.0 | 0.1 | 4.70 | 55.30 | 2.600 |
| 13 | IC4 | 103.3 | 217.9 | 0.0 | 53.0 | 0.1 | 3.80 | 56.20 | 0.046 |
| 15 | IC4 | 103.3 | 217.9 | 0.0 | 60.0 | 0.1 | 2.60 | 42.50 | 0.122 |
| 19 | IC4 | 110.0 | 230.0 | 0.0 | 58.0 | 0.1 | 4.30 | 37.50 | 1.810 |

| Sample # | Flow Index (I21) | MFR (I21/I2) | Foulant Density (g/cc) | Product Density (g/cc) | MWD (PDI) | Wt. Free Flowing (g) | Wt. Fouling (g) | Wt. % Fouling (g) | Cat. Prod. g/g/hr | Solids Conc. (wt/vo) |
|---|---|---|---|---|---|---|---|---|---|---|
| 86 | 9.61 | 86.6 | — | 0.9521 | — | 144.5 | 0 | 0.00 | 3,096 | 14.45 |
| 90 | 3.31 | 137.9 | — | 0.9542 | — | 148.0 | 0 | 0.00 | 1,127 | 14.8 |
| 94 | 18.81 | 70.2 | — | 0.9607 | — | 138.2 | 0.04 | 0.03 | 1,808 | 13.824 |
| 96 | 5.14 | 102.8 | — | 0.9541 | — | 144.3 | 0 | 0.00 | 982 | 14.43 |
| 98 | 17.36 | 60.1 | — | 0.9507 | — | 150.6 | 0 | 0.00 | 1,544 | 15.06 |
| 100 | 55.2 | 57.1 | — | 0.9392 | — | 159.2 | 0 | 0.00 | 1,611 | 15.92 |
| 102 | — | — | — | — | — | 0.0 | 3.2 | 100.00 | 56 | 0.32 |
| 104 | — | — | — | 0.9182 | — | 12.6 | 0.04 | 0.32 | 161 | 1.264 |
| 106 | 27.1 | 57.7 | — | 0.9612 | — | 133.1 | 0.23 | 0.17 | 1,311 | 13.333 |
| 108 | >200 | >164 | 0.9451 | — | — | 0.0 | 44.7 | 100.00 | 486 | 4.47 |
| 110 | 69.44 | 219.7 | 0.9494 | — | — | 0.0 | 43.5 | 100.00 | 853 | 4.35 |
| 114 | 122.0 | 66.7 | 0.9402 | — | — | 0.0 | 122.3 | 100.00 | 935 | 12.23 |
| 116 | 139.2 | 74.8 | 0.9461 | — | — | 0.0 | 61.5 | 100.00 | 1,118 | 6.15 |
| 124 | 86.7 | 37.37 | 0.9352 | — | — | 0.0 | 79.6 | 100.00 | 1,327 | 7.96 |
| 128 | 33.96 | 61.7 | — | 0.9534 | — | 110.3 | 1.33 | 1.19 | 2,848 | 11.163 |
| 135 | 8.63 | 196.1 | — | 0.9590 | — | 149.6 | 0 | 0.00 | 2,623 | 14.96 |

TABLE 5-continued

| | | | | | | | | | | |
|---|---|---|---|---|---|---|---|---|---|---|
| 137 | 58.51 | 66.0 | — | 0.9310 | — | 167.8 | 0 | 0.00 | 1,742 | 16.78 |
| 141 | — | — | — | — | — | 0.0 | 19.6 | 100.00 | 130 | 1.96 |
| 143 | — | — | — | — | — | — | — | — | 0 | 0 |
| 144 | 7.42 | 82.4 | — | 0.9601 | — | 83.9 | 0.04 | 0.04765 | 1,526 | 8.394 |
| 146 | 6.13 | 87.6 | — | 0.9568 | — | 122.6 | 0.15 | 0.12223 | 2,315 | 12.272 |
| 148 | 7.53 | 76.8 | — | 0.9550 | — | 142.2 | 0.027 | 0.01898 | 2,971 | 14.2247 |
| 154 | 9.01 | 70.9 | — | 0.9578 | — | 119.6 | — | 0 | 2,135 | 11.958 |
| 156 | 8.03 | 6.6 | — | 0.9531 | — | 139.6 | 0.15 | 0.10737 | 3,131 | 13.97 |
| 1 | — | — | — | — | — | 0.0 | 0 | — | 0 | 0 |
| 3 | 5.020 | 88.1 | — | 0.9564 | — | 144.5 | 0 | 0.00 | 2,777 | 14.448 |
| 4 | 5.770 | 68.7 | — | 0.9583 | — | 141.4 | 0 | 0.00 | 2,561 | 14.137 |
| 5 | 5.180 | 78.5 | — | 0.9580 | — | 113.6 | 0 | 0.00 | 2,366 | 11.356 |
| 6 | 5.960 | 76.4 | — | 0.9581 | — | 127.4 | 0 | 0.00 | 2,403 | 12.737 |
| 7 | 7.240 | 86.2 | — | 0.9529 | — | 140.5 | 0.041 | 0.03 | 3,690 | 14.0501 |
| 9 | 83.180 | 32.0 | 0.9464 | — | — | 0.0 | 120.32 | 100.00 | 2,270 | 12.032 |
| 13 | 4.800 | 104.3 | — | 0.9505 | — | 0.0 | 0 | — | 0 | 0 |
| 15 | 8.470 | 69.4 | — | 0.9536 | — | 141.9 | 0.012 | 0.01 | 3,146 | 14.1882 |
| 19 | 94.960 | 52.5 | 0.949 | — | — | 0.0 | 111.57 | 100.00 | 2,761 | 11.157 |

The data further show that product can be produced at a lower density using the fluorinated hydrocarbon diluents without fouling. This is shown graphically in FIG. 1.

Having now fully described this invention, it will be appreciated by those skilled in the art that the invention can be performed within a wide range of parameters within what is claimed, without departing from the spirit and scope of the invention.

All documents described herein are incorporated by reference herein, including any priority documents and/or testing procedures, tot he extent that they are not inconsistent with the disclosure herein.

We claim:

1. A process for producing polymer comprising polymerizing ethylene and optionally one or more comonomers in the presence of a chromium catalyst system and a diluent to form a slurry of polymer solids, wherein the diluent comprises at least 5 volume percent of a fluorinated hydrocarbon based on the total volume of the diluent.

2. The process of claim 1 wherein the fluorinated hydrocarbon is represented by the formula: $C_xH_yF_z$ wherein x is an integer from 1 to 40, and y and z are integers of at least one.

3. The process of claim 2 wherein x is an integer in the range of from 1 to 10.

4. The process of claim 1 wherein the molar ratio of the fluorinated hydrocarbon to the chromium is greater than 100:1.

5. The process of claim 1 wherein the diluent further comprises at least one $C_1$ to $C_{40}$ alkane.

6. The process of claim 1 wherein the diluent comprises a mixture of at least one saturated hydrocarbon and at least one fluorinated hydrocarbon wherein the mixture has a density in the range of from 0.2 g/cc less than to 0.2 g/cc greater than the density of the polymer.

7. The process of claim 1 wherein the diluent comprises a mixture of at least one saturated hydrocarbon and at least one fluorinated hydrocarbon and the fluorinated hydrocarbon comprises greater than 1 weight percent of the mixture.

8. The process of claim 7 wherein the fluorinated hydrocarbon comprises greater than 5 weight percent of the mixture.

9. The process of claim 8 wherein the fluorinated hydrocarbon comprises greater than 10 weight percent of the mixture.

10. The process of claim 1 wherein the diluent comprises a mixture of at least one saturated hydrocarbon and at least one fluorinated hydrocarbon and the fluorinated hydrocarbon comprises greater than 1 volume percent of the mixture.

11. The process of claim 10 wherein the fluorinated hydrocarbon comprises greater than 5 volume percent of the mixture.

12. The process of claim 1 wherein ethylene comprises 50 weight % or more of the total weight of ethylene and comonomer polymerized.

13. The process of claim 1 wherein ethylene comprises 75 weight % or more of the total weight of ethylene and comonomer polymerized.

14. The process of claim 1 wherein ethylene comprises 85 weight % or more of the total weight of ethylene and comonomer polymerized.

15. The process of claim 1 wherein the polymer has a melting temperature of greater than or equal to 75° C.

16. The process of claim 1 wherein the polymer has a melting temperature of greater than or equal to 95° C.

17. The process of claim 1 wherein the polymer has a melting temperature of greater than or equal to 110° C.

18. The process of claim 1 wherein the polymer has a heat of fusion greater than or equal to 10 J/g.

19. The process of claim 1 wherein the polymer has a heat of fusion greater than or equal to 70 J/g.

20. The process of claim 1 wherein the polymer has a heat of fusion greater than or equal to 130 J/g.

21. The process of claim 1 wherein the polymer has crystallinity derived from ethylene incorporation of greater than or equal to 10%.

22. The process of claim 1 wherein the polymer has crystallinity derived from ethylene incorporation of greater than or equal to 20%.

23. The process of claim 1 wherein the polymer has crystallinity derived from ethylene incorporation of greater than or equal to 40%.

24. The process of claim 1 wherein the one or more comonomers contain olefinic unsaturation and are capable of insertion polymerization.

25. The process of claim 1 wherein the one or more comonomers are selected from linear or branched $C_3$ to $C_{20}$ alpha olefins.

26. The process of claim 1 wherein the one or more comonomers are selected from linear $C_3$ to $C_8$ alpha olefins.

27. The process of claim 24 wherein the one or more comonomers include at least one polyene.

28. The process of claim 1 wherein the one or more comonomers are selected from hydrocarbons, vinyl acids, alcohols, esters, and mixtures thereof.

29. The process of claim 1 wherein the process is carried out in a loop reactor.

30. The process of claim 1 wherein the process is carried out in a stirred tank reactor.

31. The process of claim 1, further comprising continuously discharging a portion of the slurry from a reactor as polymerization effluent.

32. The process of claim 31 further comprising flashing the polymerization effluent in a first flash to vaporize from about 50% to about 100% of the liquid medium to produce concentrated polymer effluent and vaporized liquid.

33. The process of claim 32 further comprising condensing the vapor obtained in the first flash without compression.

34. The process of claim 33 further comprising operating the reactor at a space time yield greater than 2.6 lbs/hr-gal.

35. The process of claim 34 wherein the reactor is operated at a space time yield greater than 3.0 lbs/hr-gal.

36. The process of claim 35 wherein the reactor is operated at a space time yield greater than 3.3 lbs/hr-gal.

37. The process of claim 32 further comprising discharging from the first flash polymer solids to a second flash through a seal chamber of sufficient dimension such as to maintain a volume of polymer solids/slurry in the seal chamber sufficient to maintain a pressure seal.

38. The process of claim 6, wherein the volume percent solids in the polymerization slurry in a reactor is greater than 50.

39. The process of claim 38 wherein the volume percent solids in the polymerization slurry in the reactor is greater than 60.

40. The process of claim 39 wherein the volume percent solids in the polymerization slurry in the reactor is greater than 70.

41. The process of claim 32 wherein the first flash is operated at from about 140 psia to about 315 psia.

42. The process of claim 32 wherein the concentrated polymer effluent and vaporized liquid are continuously separated.

43. The process of claim 32 wherein the concentrated polymer effluent slurry is flashed in a second flash to vaporize liquid.

44. The process of claim 32 wherein the vapor from the first flash is condensed by heat exchange.

45. The process of claim 29, wherein the polymerization slurry is circulated within the loop reactor by multiple pumps and wherein the reactor volume is greater than 20,000 gallons.

46. The process of claim 32 further comprising heating the polymerization effluent.

47. The process of claim 46 wherein the polymerization effluent is heated to a temperature below the fusion temperature of the polymer.

48. The process of claim 47 wherein the quantity of heat supplied to the polymerization effluent is at least equal to that quantity of heat which equals the heat of vaporization of the liquid medium which is to be flashed in the first flash.

49. The process of claim 31 wherein the polymer solids are separated from the diluent with a centrifuge apparatus.

50. The process of claim 1 wherein the polymerization is carried out at a temperature of from 0° C. to about 200° C.

51. The process of claim 1 wherein the polymerization is carried out at a temperature of from greater than 30° C. to about 180° C.

52. The process of claim 1 wherein the polymerization is carried out at a pressure of from 1 to 100 atmospheres.

53. The process of claim 1, wherein the chromium catalyst system further comprises a cocatalyst.

54. The process of claim 53, wherein the cocatalyst is a metal alkyl or organometal.

55. The process of claim 53, wherein the cocatalyst is an aluminum compound of the formula $AlR'_n X_{3-n}$, where X is a hydride or halide, R' is a $C_1$ to $C_{12}$ alkyl, and n is an integer of from 1 to 3.

56. The process of claim 29, wherein the polymerization slurry is circulated within the loop reactor by multiple pumps and wherein the reactor volume is greater than 20,000 gallons.

* * * * *